(12) United States Patent
Lidsky et al.

(10) Patent No.: US 11,557,970 B2
(45) Date of Patent: Jan. 17, 2023

(54) RESONANT RECTIFIED DISCONTINUOUS SWITCHING REGULATOR WITH INDUCTOR PREFLUX

(71) Applicant: EMPOWER SEMICONDUCTOR, INC., Newark, CA (US)

(72) Inventors: David Lidsky, Oakland, CA (US); Timothy Alan Phillips, Hope, RI (US); Parag Oak, Sunnyvale, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 0 days.

(21) Appl. No.: 16/513,473

(22) Filed: Jul. 16, 2019

(65) Prior Publication Data

US 2019/0341849 A1  Nov. 7, 2019

Related U.S. Application Data

(63) Continuation of application No. 15/689,698, filed on Aug. 29, 2017, now Pat. No. 10,389,246, which is a (Continued)

(51) Int. Cl.
*H02M 3/158* (2006.01)
*H02M 1/00* (2006.01)
(Continued)

(52) U.S. Cl.
CPC .............. *H02M 3/158* (2013.01); *G05F 1/10* (2013.01); *H02M 1/0095* (2021.05);
(Continued)

(58) Field of Classification Search
CPC ......... H02M 3/158; H02M 2001/0009; H02M 1/08; H02M 2001/0058; H02M 3/33546; H02M 3/156; H02M 3/07; H02M 3/18
See application file for complete search history.

(56) References Cited

U.S. PATENT DOCUMENTS 5,684,688 A    11/1997 Rouaud et al.
7,138,994 B2 * 11/2006 Cho ...................... G09G 3/2965
                                                       345/211
(Continued)

FOREIGN PATENT DOCUMENTS

WO    2012074967 A1    6/2012

OTHER PUBLICATIONS

U.S. Appl. No. 15/689,997, "Advisory Action", dated Sep. 11, 2019, 3 pages.
(Continued)

*Primary Examiner* — Gustavo A Rosario-Benitez
(74) *Attorney, Agent, or Firm* — Kilpatrick Townsend & Stockton LLP

(57) ABSTRACT

A switched-mode power regulator circuit has four solid-state switches connected in series and a capacitor and an inductor that regulate power delivered to a load. The solid-state switches are operated such that a voltage at the load is regulated by repetitively (1) prefluxing the inductor then charging the capacitor causing an increased current to flow in the inductor and (2) prefluxing the inductor then discharging the capacitor causing increased current to flow in the inductor. The inductor prefluxing steps enable the circuit to provide increased output voltage and/or increased output current.

13 Claims, 14 Drawing Sheets

Related U.S. Application Data continuation of application No. 15/046,145, filed on Feb. 17, 2016, now Pat. No. 9,780,663, which is a continuation-in-part of application No. 14/635,853, filed on Mar. 2, 2015, now Pat. No. 9,300,210.

(51) Int. Cl.
  *H02M 3/07* (2006.01)
  *G05F 1/10* (2006.01)
  *H02M 3/156* (2006.01)

(52) U.S. Cl.
  CPC .......... *H02M 3/156* (2013.01); *H02M 1/0058* (2021.05); *H02M 3/07* (2013.01); *Y02B 70/10* (2013.01)

(56) References Cited

U.S. PATENT DOCUMENTS

| | | | |
|---|---|---|---|
| 8,022,682 B2* | 9/2011 | Honda | H02M 1/36 323/284 |
| 8,427,113 B2* | 4/2013 | Xing | H02M 3/1588 320/145 |
| 9,780,656 B2 | 10/2017 | Lidsky et al. | |
| 9,780,663 B2 | 10/2017 | Lidsky et al. | |
| 10,389,246 B1 | 8/2019 | Lidsky et al. | |
| 10,622,890 B1 | 4/2020 | Lidsky et al. | |
| 11,146,170 B2 | 10/2021 | Xiong et al. | |
| 2004/0036686 A1 | 2/2004 | Cho et al. | |
| 2004/0141345 A1 | 7/2004 | Cheng et al. | |
| 2005/0017699 A1 | 1/2005 | Stanley et al. | |
| 2005/0099364 A1 | 5/2005 | Jung et al. | |
| 2005/0190583 A1 | 9/2005 | Morimoto et al. | |
| 2007/0115704 A1 | 5/2007 | Ito | |
| 2008/0157723 A1 | 7/2008 | Xing et al. | |
| 2009/0033289 A1 | 2/2009 | Xing et al. | |
| 2010/0244798 A1 | 9/2010 | Nakatomi et al. | |
| 2011/0018511 A1 | 1/2011 | Carpenter et al. | |
| 2011/0316502 A1 | 12/2011 | Tang et al. | |
| 2013/0002215 A1 | 1/2013 | Ikeda et al. | |
| 2013/0021011 A1 | 1/2013 | Okuda et al. | |
| 2013/0119961 A1 | 5/2013 | Okuda et al. | |
| 2013/0127523 A1 | 5/2013 | Vereb et al. | |
| 2013/0207625 A1 | 8/2013 | Futamura et al. | |
| 2013/0343103 A1 | 12/2013 | Takizawa | |
| 2014/0001856 A1 | 1/2014 | Agamy et al. | |
| 2014/0211520 A1 | 7/2014 | Zhang et al. | |
| 2014/0232364 A1 | 8/2014 | Thomas et al. | |
| 2014/0266135 A1 | 9/2014 | Zhak et al. | |
| 2014/0354349 A1 | 12/2014 | Liu et al. | |
| 2014/0361755 A1 | 12/2014 | Tateishi et al. | |
| 2014/0375291 A1* | 12/2014 | Tomasz | H02M 3/156 323/282 |
| 2014/0376287 A1 | 12/2014 | Narimani et al. | |
| 2015/0061382 A1 | 3/2015 | Roessler | |
| 2015/0061613 A1 | 3/2015 | Kondou | |
| 2015/0091544 A1* | 4/2015 | Jayaraj | H02M 3/156 323/284 |
| 2015/0280608 A1 | 10/2015 | Yoscovich et al. | |
| 2015/0311793 A1 | 10/2015 | Khayat et al. | |
| 2015/0366007 A1* | 12/2015 | Gong | H05B 41/3921 315/291 |
| 2016/0118886 A1 | 4/2016 | Zhang et al. | |
| 2016/0190921 A1 | 6/2016 | Kumar et al. | |
| 2016/0254689 A1* | 9/2016 | Lee | H02J 7/00 320/107 |
| 2016/0254746 A1* | 9/2016 | Lerdworatawee | H03F 3/21 323/271 |
| 2016/0261185 A1 | 9/2016 | Lidsky et al. | |
| 2016/0261189 A1 | 9/2016 | Lidsky et al. | |
| 2016/0344214 A1 | 11/2016 | Petersen et al. | |
| 2017/0237339 A1 | 8/2017 | Young et al. | |
| 2017/0250607 A1 | 8/2017 | Zhak et al. | |
| 2017/0338735 A1 | 11/2017 | Alarcon-Cot et al. | |

OTHER PUBLICATIONS

U.S. Appl. No. 15/689,997, "Corrected Notice of Allowability", dated Dec. 27, 2019, 2 pages.
U.S. Appl. No. 15/689,997, "Notice of Allowance", dated Dec. 4, 2019, 11 pages.
U.S. Appl. No. 14/635,853, "First Action Interview Office Action Summary", dated Jun. 3, 2015, 2 pages.
U.S. Appl. No. 14/635,853, "Non-Final Office Action", dated Jun. 3, 2015, 18 pages.
U.S. Appl. No. 14/635,853, "Notice of Allowance", dated Nov. 17, 2015, 12 pages.
U.S. Appl. No. 14/790,536, "Non-Final Office Action", dated Nov. 18, 2016, 16 pages.
U.S. Appl. No. 14/790,536, "Notice of Allowance", dated May 31, 2017, 15 pages.
U.S. Appl. No. 14/790,536, "Supplemental Notice of Allowance", dated Jun. 21, 2017, 2 pages.
U.S. Appl. No. 15/046,145, "Non-Final Office Action", dated Dec. 1, 2016, 18 pages.
U.S. Appl. No. 15/046,145, "Notice of Allowance", dated May 30, 2017, 10 pages.
U.S. Appl. No. 15/046,145, "Supplemental Notice of Allowance", dated Jul. 13, 2017, 2 pages.
U.S. Appl. No. 15/689,698, "Corrected Notice of Allowability", dated Jun. 12, 2019, 5 pages.
U.S. Appl. No. 15/689,698, "Corrected Notice of Allowability", dated May 30, 2019, 8 pages.
U.S. Appl. No. 15/689,698, "First Action Interview Office Action Summary", dated Jun. 27, 2018, 5 pages.
U.S. Appl. No. 15/689,698, "First Action Interview Pilot Program Pre-Interview Communication", dated Mar. 29, 2018, 3 pages.
U.S. Appl. No. 15/689,698, "Notice of Allowance", dated Apr. 4, 2019, 15 pages.
U.S. Appl. No. 15/689,997, "Advisory Action", dated Dec. 27, 2018, 5 pages.
U.S. Appl. No. 15/689,997, "Advisory Action", dated Feb. 13, 2019, 5 pages.
U.S. Appl. No. 15/689,997, "Final Office Action", dated Jun. 13, 2019, 13 pages.
U.S. Appl. No. 15/689,997, "Final Office Action", dated Aug. 31, 2018, 14 pages.
U.S. Appl. No. 15/689,997, "First Action Interview Office Action Summary", dated May 31, 2018, 5 pages.
U.S. Appl. No. 15/689,997, "First Action Interview Pilot Program Pre-Interview Communication", dated Mar. 26, 2018, 3 pages.
U.S. Appl. No. 15/689,997, "Non-Final Office Action", dated Mar. 21, 2019, 13 pages.
Kesarwani, "Resonant switched-capacitor converters for chip-scale power delivery: Modeling and design", Control and Modeling for Power Electronics (COMPEL), 2013 IEEE 14th Workshop on, vol., No. 1, 2013, pp. 1-23.
Kim et al., "A fully-Integrated 3-Level DC-DC Converter for Nanosecond-Scale DVFS", IEEE Journal of Solid State Circuits vol. 47, No. 1, 2012, pp. 206-219.
Stauth et al., "Resonant Switched Capacitor Converters for High-Density Power Delivery", Thayer School of Engineering at Dartmouth vol. 30, Issue: 12, Dec. 18, 2014, pp. 1-23.
Yousefzadeh et al., "Three-Level Buck Converter for Envelope Tracking Applications", IEEE Transactions on Power Electronics, vol. 21, No. 2,, 2006, pp. 549-552.
U.S. Appl. No. 16/823,834, Non-Final Office Action, dated Oct. 5, 2020, 9 pages.
Final Office Action for U.S. Appl. No. 16/823,834, dated Mar. 10, 2022, 10 pages.
U.S. Appl. No. 16/823,834, "Notice of Allowance", dated Sep. 6, 2022, 14 pages.

\* cited by examiner

RESONANT RECTIFIED DISCONTINUOUS SWITCHING REGULATOR WITH INDUCTOR PREFLUX

CROSS-REFERENCES TO RELATED APPLICATIONS

This application is a Continuation of U.S. application Ser. No. 15/689,698, for "RESONANT RECTIFIED DISCONTINUOUS SWITCHING REGULATOR WITH INDUCTOR PREFLUX", filed on Aug. 29, 2017, which is a continuation of Ser. No. 15/046,145, for "RESONANT RECTIFIED DISCONTINUOUS SWITCHING REGULATOR WITH INDUCTOR PREFLUX" filed Feb. 17, 2016, which issued as U.S. Pat. No. 9,780,663, on Oct. 3, 2017, which is a Continuation In Part of U.S. application Ser. No. 14/635,853 for "RESONANT RECTIFIED DISCONTINUOUS SWITCHING REGULATOR" filed on Mar. 2, 2015, which issued as U.S. Pat. No. 9,300,210, on Mar. 29, 2016. Each of the aforementioned disclosures are hereby incorporated by reference herein in their entirety for all purposes.

FIELD

The present invention relates generally to switched-mode power regulators and in particular to power regulators that operate at high frequencies with high efficiency.

BACKGROUND

A wide variety of electronic devices are available for consumers today. Many of these devices have integrated circuits that are powered by regulated low voltage DC power sources. These low voltage power sources are often generated by dedicated power regulator circuits that use a higher voltage input from a battery or another power source. In some applications, the dedicated power regulator circuit can be one of the largest power dissipating components of the electronic device and can sometimes consume more space than the integrated circuit that it powers.

As electronic devices become more sophisticated and more compact, the size, the performance and the efficiency of the dedicated power regulator circuits needs to be improved. Increased switching frequency of the power regulator circuit has been one of the primary design advances to address these competing requirements. Increased switching frequency reduces the size and typically the cost of the large passive components (e.g., capacitors and inductors) while also enabling the power regulator to respond to faster transient requirements. The difficulty with increased switching frequency is typically the increased switching losses associated with the increased number of switching cycles (i.e., decreased efficiency). New methods of reducing the size and improving the efficiency of power regulator circuits are needed to meet the needs of future electronic devices.

Another challenge in operating at increased switching frequencies, is the circuitry doing the control most operating at high speeds. Operating traditional power control circuitry can sometimes be impossible, and when possible may take extra current to achieve the speeds required and thus effect the efficiency of the regulator.

SUMMARY

Embodiments of the invention pertain to a power conversion circuit including a first terminal and a first solid-state switch having a pair of first switch terminals and a first control terminal wherein the pair of first switch terminals are connected between the first terminal and a first junction. A second solid-state switch, having a pair of second switch terminals and a second control terminal, is connected between the first junction and a second junction. A third solid-state switch, having a pair of third switch terminals and a third control terminal, is connected between the second junction and a third junction. A fourth solid-state switch, having a pair of fourth switch terminals and a fourth control terminal, is connected between the third junction and a ground.

Further embodiments may also include an LC circuit having a capacitor coupled between the first junction and the third junction, and an inductor coupled between the second junction and a load. Yet further embodiments may also include a controller. The controller may transmit first, second, third and fourth control signals to control the first, second, third and fourth solid-state switches through the first, second, third and fourth control terminals, respectively. The controller may operate according to an algorithm that regulates a voltage at the load by repetitively (1) generating a first preflux condition in the inductor and charging the capacitor causing an increased in current flow in the inductor and (2) generating a second preflux condition in the inductor and discharging the capacitor causing an increased in current flow in the inductor.

Some embodiments may have a duration of the first preflux condition controlled by one or more comparators. In one embodiment one of the one or more comparators has a set point that is adjusted with a variable feedback signal. In various embodiments the variable feedback signal is generated by a tuning algorithm configured to cause the inductor to be energized with an appropriate amount of current so current within the inductor resonates to zero at the same time as when the capacitor becomes fully charged.

In one embodiment the variable feedback signal controls a variable current source used to charge a programmable capacitor bank. In some embodiments a duration of the first preflux condition is controlled by a variable timer.

Some embodiments may include the power conversion circuit disposed on a unitary semiconductor die. Further embodiments may include the load on the unitary semiconductor die.

Some embodiments may include a controller configured to control the first, the second, the third and the fourth solid-state switches in a repetitive switching sequence including a first configuration where the input terminal is coupled to the load by turning on the first and the third solid-state switches. Further embodiments may have a subsequent configuration where the ground is coupled to the load by turning on the second and the fourth solid-state switches. Yet further embodiments may have a subsequent configuration where the first junction is coupled to the third junction by turning on the second and the third solid-state switches. In some embodiments, the third junction may be coupled to ground by turning on the fourth solid-state switch where the fourth solid-state switch is turned on at a slower rate than the rate at which the first, the second and the third switches were turned on.

In some embodiments, the controller commands a first and a second solid-state switch to temporarily couple a power supply to the capacitor causing the capacitor to be precharged before coupling the input terminal to the load by turning on the first and the third solid-state switches. In further embodiments the power supply is disposed on a unitary die that also contains the power conversion circuit.

In other embodiments the power supply is not disposed on a unitary die that contains the power conversion circuit.

In some embodiments the controller simultaneously monitors a voltage in the capacitor and a current in the inductor, and commands the first, the second, the third and the fourth solid-state switches into a first configuration if the voltage in the capacitor is zero before the current in in inductor is zero, and commands the first, the second, the third and the fourth solid-state switches into a second configuration if the current in the inductor is zero before the voltage in the capacitor is zero.

In some embodiments the controller is configured to (1) continue charging the capacitor until a voltage potential on the second junction is approximately zero volts, and (2) continue discharging the capacitor until the voltage potential on the second junction is approximately zero volts.

In some embodiments an electronic power conversion component including a substrate having a plurality of contacts for forming electrical connections to a circuit board is disclosed. The substrate may have one or more integrated circuit dies attached to it and the dies are electrically connected to the plurality of contacts. A power conversion circuit is disposed on one of the one or more integrated circuit dies. The power conversion circuit may include a first terminal and a first solid-state switch having a pair of first switch terminals and a first control terminal wherein the pair of first switch terminals are connected between the first terminal and a first junction. A second solid-state switch, having a pair of second switch terminals and a second control terminal, is connected between the first junction and a second junction. A third solid-state switch, having a pair of third switch terminals and a third control terminal, is connected between the second junction and a third junction. A fourth solid-state switch, having a pair of fourth switch terminals and a fourth control terminal, is connected between the third junction and a ground. Further embodiments may also include an LC circuit having a capacitor coupled between the first junction and the third junction, and an inductor coupled between the second junction and a load. A controller may transmit first, second, third and fourth control signals to control the first, second, third and fourth solid-state switches through the first, second, third and fourth control terminals, respectively, such that a voltage at the load is regulated by repetitively (1) generating a first preflux condition in the inductor and charging the capacitor causing an increased in current flow in the inductor and (2) generating a second preflux condition in the inductor and discharging the capacitor causing an increased in current flow in the inductor.

Some embodiments may have a duration of the first preflux condition controlled by one or more comparators. In one embodiment one of the one or more comparators has a set point that is adjusted with a variable feedback signal. In various embodiments the variable feedback signal is generated by a tuning algorithm configured to cause the inductor to be energized with an appropriate amount of current so current within the inductor resonates to zero at the same time as when the capacitor becomes fully charged.

In one embodiment the variable feedback signal controls a variable current source used to charge a programmable capacitor bank. In some embodiments a duration of the first preflux condition is controlled by a variable timer.

Some embodiments may include the power conversion circuit disposed on a unitary semiconductor die. Further embodiments may include the load on the unitary semiconductor die.

Some embodiments include a method of operating a power conversion circuit, where the method includes supplying power to the power conversion circuit with a power supply connected to a first terminal. The power conversion circuit may include the first terminal and a first solid-state switch having a pair of first switch terminals and a first control terminal wherein the pair of first switch terminals are connected between the first terminal and a first junction. A second solid-state switch, having a pair of second switch terminals and a second control terminal, is connected between the first junction and a second junction. A third solid-state switch, having a pair of third switch terminals and a third control terminal, is connected between the second junction and a third junction. A fourth solid-state switch, having a pair of fourth switch terminals and a fourth control terminal, is connected between the third junction and a ground. Further embodiments may also include an LC circuit having a capacitor coupled between the first junction and the third junction, and an inductor coupled between the second junction and a load. In some embodiments the power conversion circuit is disposed on a unitary semiconductor die. In other embodiments the configuration of the first, the second, the third and the fourth solid-state switches may be changed such that a voltage at the load is regulated by repetitively (1) generating a first preflux condition in the inductor and charging the capacitor causing an increased in current flow in the inductor and (2) generating a second preflux condition in the inductor and discharging the capacitor causing an increased in current flow in the inductor.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Certain embodiments of the present invention relate to power regulator circuits. While the present invention can be useful for a wide variety of power regulator circuits, some embodiments of the invention are particularly useful for power regulator circuits that can operate at relatively high frequencies and high efficiencies enabling the circuits to be completely contained on a unitary integrated circuit (IC) device adjacent to the load that it powers, as described in more detail below.

Figure 1:
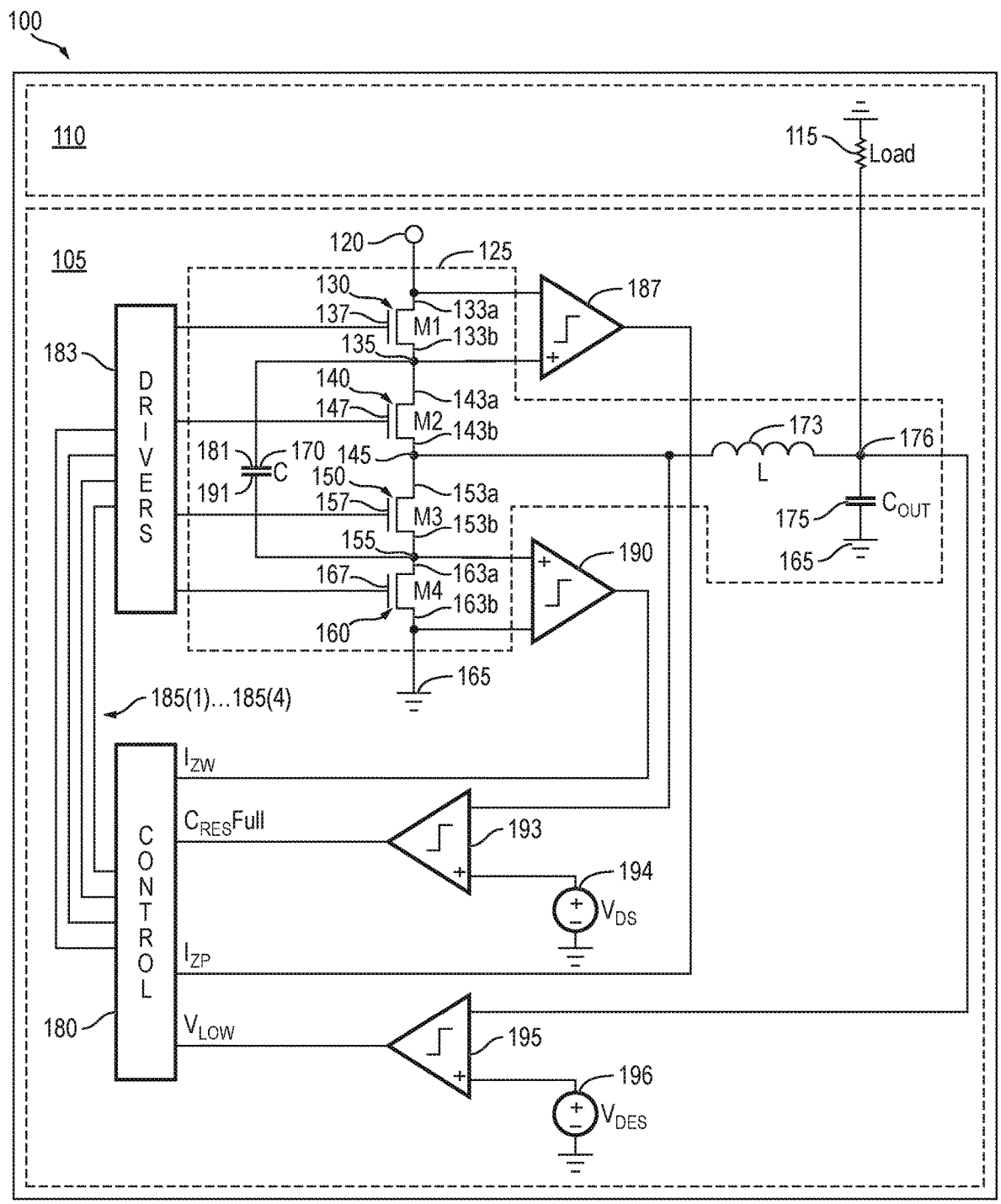
FIG. 1 is a schematic of a unitary die containing a power regulator portion and a load portion according to an embodiment of the invention.

Now referring to FIG. 1 a non-limiting example block diagram of a power regulator circuit and a load integrated on a unitary IC device is illustrated. Unitary IC 100 may have a power regulator portion 105 and a load portion 110 monolithically integrated. Load portion 110 may perform any function including, but not limited to, a central processing unit, a graphics processing unit, an application processing unit, a display driver, or other function. Load portion 110 may be illustrated schematically by a load resistor 115.

Power regulator portion 105 may be configured to receive an input voltage from a first terminal 120 and supply a regulated output voltage to load 115. Power regulator portion 105 may have a switched regulation circuit 125 that is operated and controlled by one or more peripheral circuits, as discussed in more detail below.

Switched regulation circuit 125 may comprise four solid-state switches connected in series, an LC circuit and an output capacitor. More specifically, power regulation circuit 125 may be supplied with DC power through first terminal 120. A first solid-state switch 130 has a pair of first switch terminals 133a, 133b connected between first terminal 120 and a first junction 135, respectively. First solid-state switch 130 may also have a first control terminal 137 that may be used to transition the first solid-state switch between an on state and an off state, as discussed in more detail below.

A second solid-state switch 140 has a pair of second switch terminals 143a, 143b connected between first junction 135 and a second junction 145, respectively. Second solid-state switch 140 further has a second control terminal 147. A third solid-state switch 150 has a pair of third switch terminals 153a, 153b connected between second junction 145 and a third junction 155, respectively. Third solid-state switch further has a third control terminal 157. Fourth solid-state switch 160 has a pair of fourth switch terminals 163a, 163b connected between third junction 155 and a ground 165, respectively. Fourth solid-state switch 160 further has a fourth control terminal 167. An LC circuit includes a capacitor 170 connected between first junction 135 and third junction 155, and an inductor 173 connected between second junction 145 and load 115. In further embodiments, inductor 173 may be in series with capacitor 170. An output capacitor 175 is connected between inductor 173 and load 115 and coupled to ground 165. An output node 176, to which inductor 173, output capacitor 175 and load 115 are connected may be used to monitor an output voltage (Vout) of switched regulation circuit 125. For ease of identification, labels M1, M2, M3 and M4 may be used throughout this disclosure to identify first solid-state switch 130, second solid-state switch 140, third solid-state switch 150 and fourth solid-state switch 160, respectively. In some embodiments, the inductor 173 can be located between the capacitor 170 and either node 135 or node 155.

A controller is configured to receive inputs from the switched regulation circuit and control the operation of the solid state switches to provide a substantially constant output, as discussed in more detail below. Controller 180 may be coupled to driver circuits 183 with control lines 185(1) . . . 185(4) such that each control line controls the operation of one solid-state switch. In one embodiment, controller 180 may transmit high and low control signals through control lines 185(1) . . . 185(4) to operate a corresponding driver circuit 183. Driver circuits 183 may be coupled to first, second, third and fourth control terminals 137, 147, 157, 167, respectively of first, second, third and fourth solid state switches, 130, 140, 150, 160, respectively. Driver circuits 183 may receive commands from controller 180 and control the operation of first, second, third and fourth solid state switches, 130, 140, 150, 160, respectively by sending signals through first, second, third and fourth control terminals 137, 147, 157, 167, respectively. Driver circuits 183 can have other functions, for example, converting the voltage level of the control circuitry to voltages for the drivers.

In some embodiments, controller 180 may regulate the voltage at output node 176 by controlling the first, second, third and fourth solid state switches, 130, 140, 150, 160, respectively, by repetitively (1) charging capacitor 170 causing a current to flow in inductor 173 and (2) discharging the capacitor causing current to flow in the inductor, as discussed in more detail below.

In some embodiments, one or more peripheral circuits may be employed individually or in combination with each other to aid controller 180 in operating switched regulation circuit 125. In one embodiment, a first comparator 187 may be connected from first terminal 120 to a first side 181 of capacitor 170 and be configured to compare the respective voltage levels. By comparing voltage levels, first comparator 187 may monitor the current flowing through first solid-state switch 130 (i.e., zero volts across the comparator equates to zero current flowing through first solid state switch). Similarly, second comparator 190 may be connected between ground 165 and a second side 191 of capacitor 170 and be configured to detect current flowing through fourth solid-state switch 160. Thus, first and second comparators 187, 190, respectively may be used to monitor current flowing through inductor 173 when first or fourth solid-state switches, 130, 160, respectively, are coupled in series with the inductor, as described in further detail below.

In another embodiment a third comparator 193 may be connected between second junction 145 and a first voltage source 194. In one embodiment first voltage source 194 may be a ground connection (i.e., having a potential of 0 volts). In some embodiments, a voltage level of first voltage source 194 may be used to create a timing offset for controller 180 to accommodate for delays in switch actuation. Third comparator 193 may be used to detect the voltage at second junction 145 when it is equivalent to the voltage of first voltage source 194 Similarly, fourth comparator 195 may be connected between output node 176 (Vout) and a second voltage source 196 such that it notifies controller 180 when it detects that Vout is equivalent to the second voltage source. Second voltage source 196 may also be adjusted to compensate for switch actuation delays. The combination of first, second, third and fourth comparators, 187, 190, 193, 195, respectively, may be used to aid controller 180 in detecting the current in inductor 173, the voltage across capacitor 170, and the voltage at output node 176 (Vout). In other embodiments different methods may be used to detect voltages and currents in switched regulation circuit 125 without departing from this invention. For example, in one embodiment a voltage across inductor 173 may be used to detect current in the inductor.

Although FIG. 1 illustrates a unitary IC 100 with all components integrated within the unitary IC, other embodiments may have the components disposed on more than one IC, while further embodiments may have one or more components that are not on an IC and disposed on circuitry adjacent the IC. For example, one embodiment may have output capacitor 175 or inductor 173 disposed adjacent one or more ICs. In other embodiments, one or more switches or drivers or control circuits may be on a separate IC.

Figure 2:
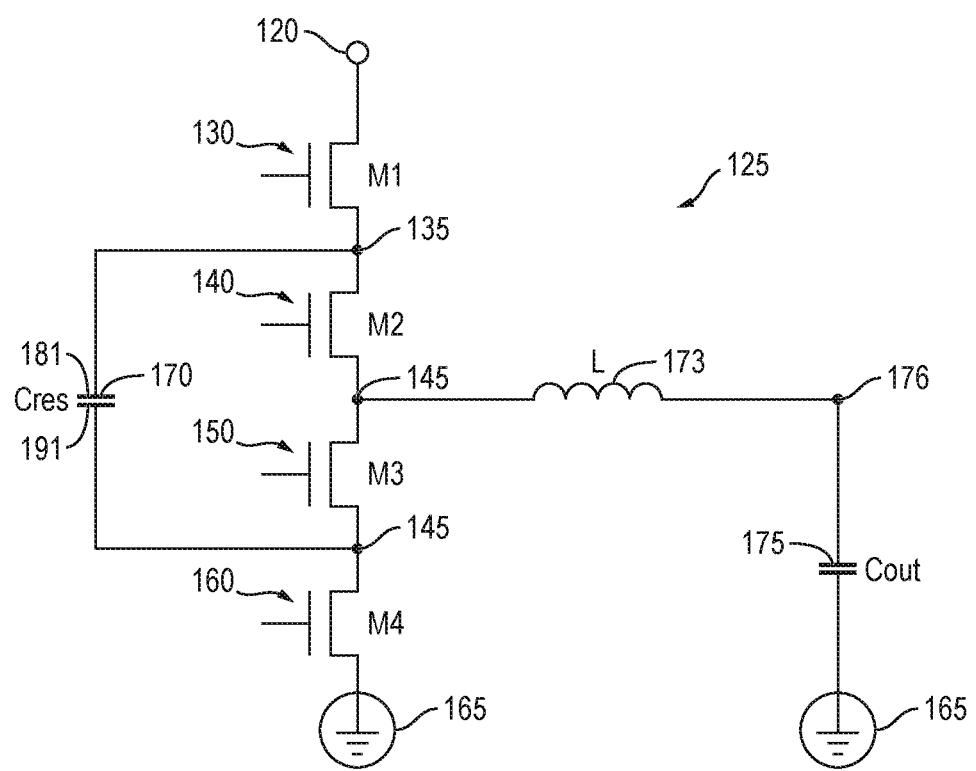
FIG. 2 is a schematic of the switched regulation circuit that has been removed from the power regulator portion of the schematic in FIG. 1.

Now referring to FIG. 2, for simplicity of illustration, switched regulation circuit 125 has been removed from power regulator portion 105 of unitary IC device 100 shown in FIG. 1. Switched regulation circuit 125 will be used to show the repetitive switching sequence used by the power regulator to control the voltage at output node 176 (Vout) delivered to load 115 (see FIG. 1).

Figure 3:
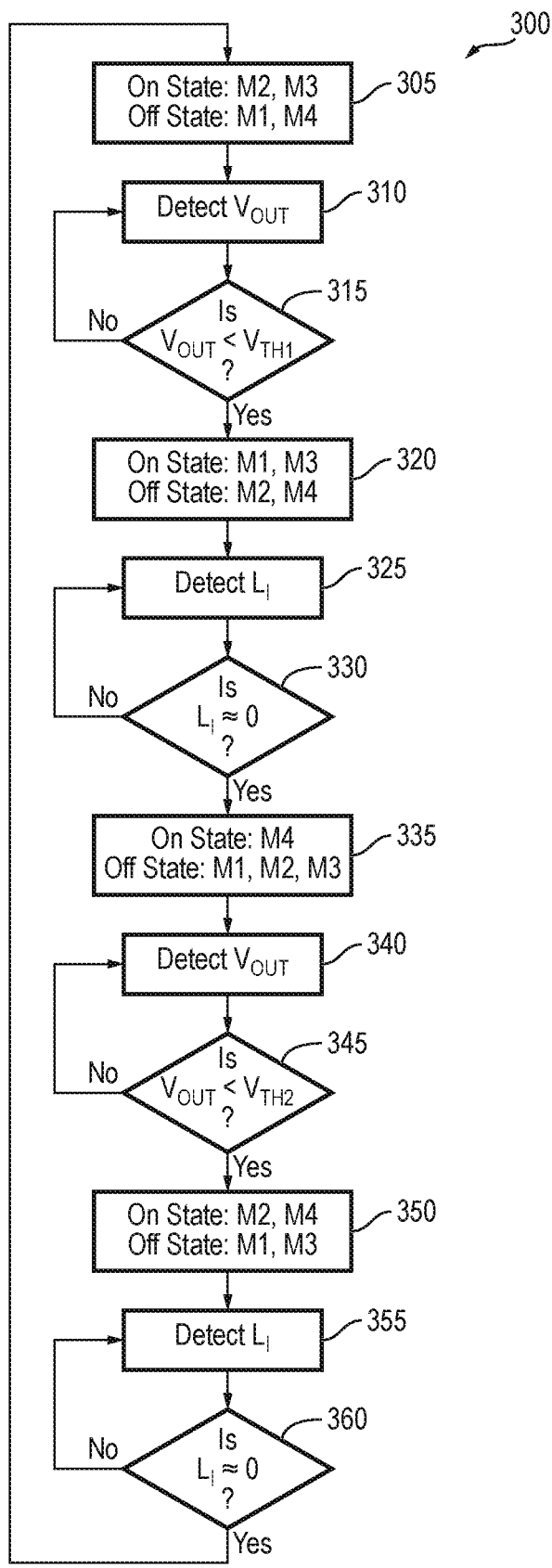
FIG. 3 is a flowchart of a repetitive switching sequence for the switched regulation circuit in FIG. 2 according to an embodiment of the invention.
Figure 6:
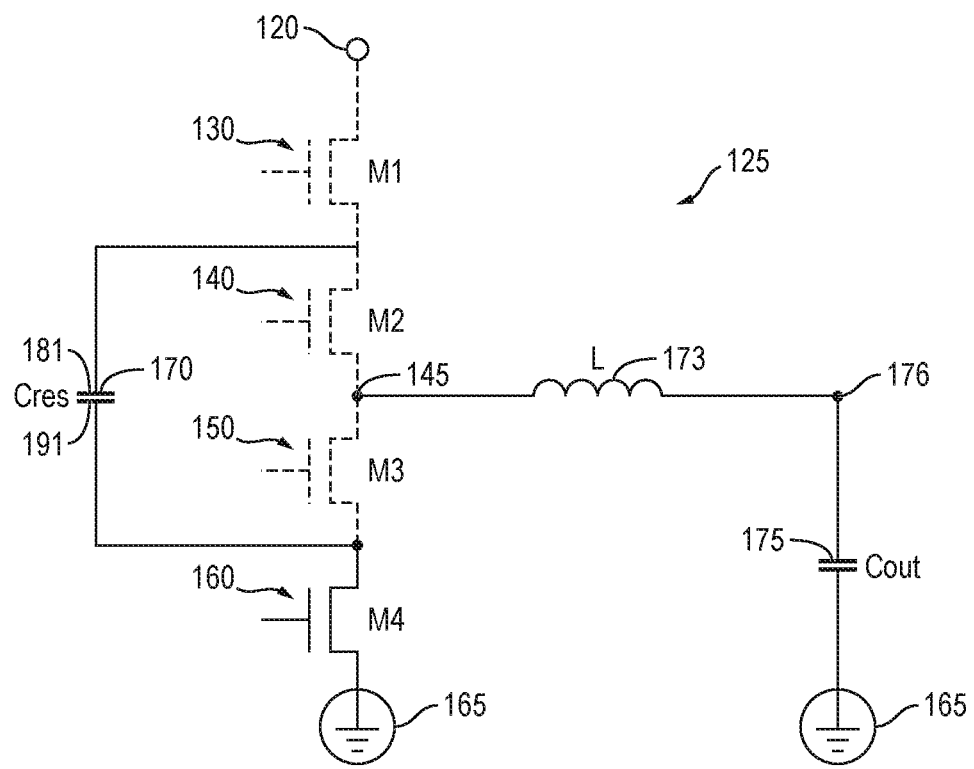
FIG. 6 is a schematic of the switched regulation circuit shown in FIG. 2 in a particular switch configuration according to the flowchart in FIG. 3.
Figure 7:
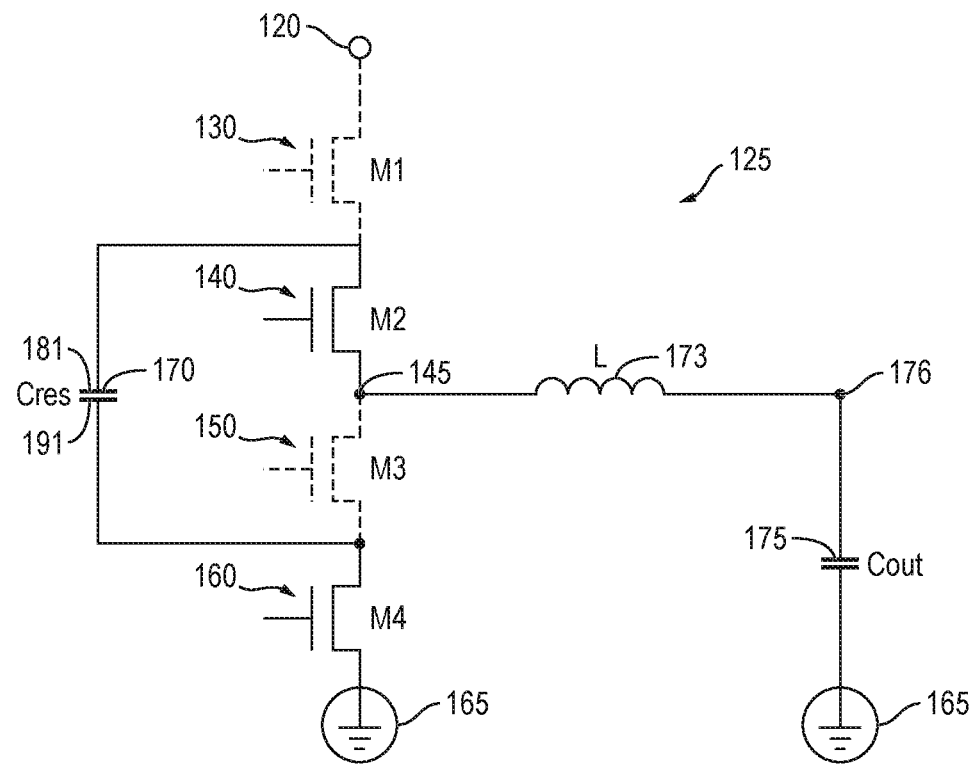
FIG. 7 is a schematic of the switched regulation circuit shown in FIG. 2 in a particular switch configuration according to the flowchart in FIG. 3.
Figure 8:
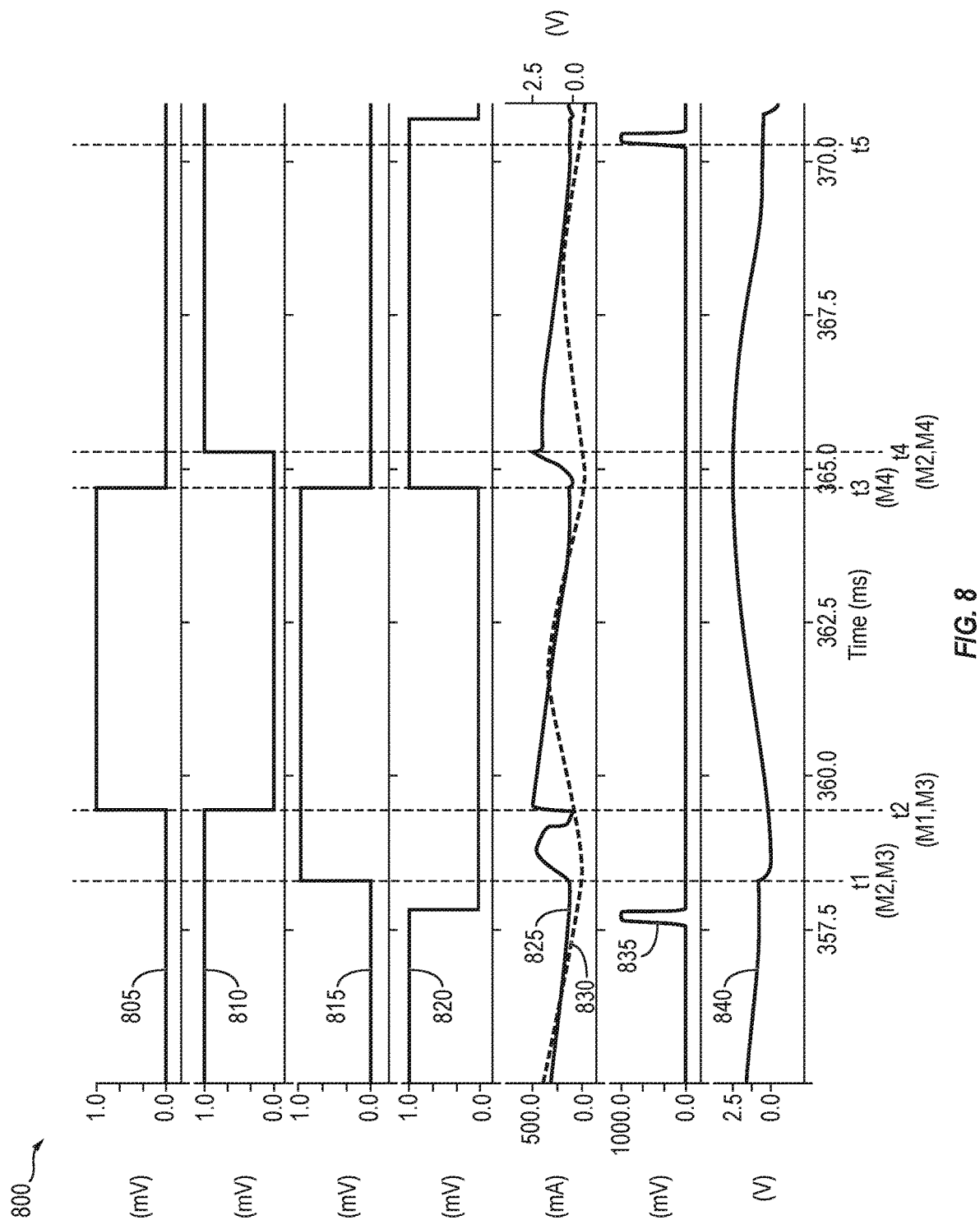
FIG. 8 is a timing diagram of voltages and currents within the switched regulation circuit of FIG. 2 according to the switching sequence in FIG. 3.

Now referring simultaneously to FIGS. 3-8 a first embodiment of a switching sequence and timing diagram for switched regulation circuit 125 is illustrated. FIG. 3 identifies four different solid-state switch configurations, the order in which the solid-state switches are turned on and off and the decisions between each step. FIGS. 4-7 illustrate simplified circuit schematics of each of the four different solid-state switch configurations. Solid-state switches in the on state are depicted with solid lines and solid-state switches that are in the off state are depicted with dashed lines. FIG. 8 illustrates an example timing diagram, showing the control signals delivered to each of the four solid-state switches as well as the voltage at second junction 145, the current within inductor 173, an inductor current comparator output and the voltage across capacitor 173. The switching sequence illustrated in FIGS. 3-8 is only an example and other sequences, timings and configurations are within the scope of this disclosure.

Figure 4:
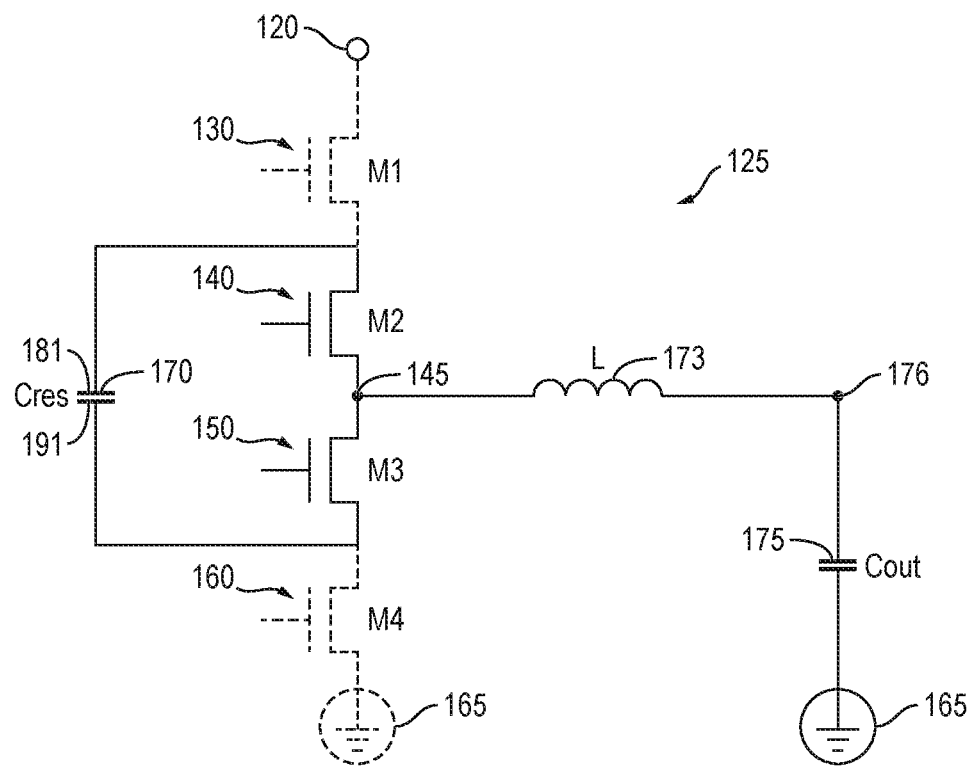
FIG. 4 is a schematic of the switched regulation circuit shown in FIG. 2 in a particular switch configuration according to the flowchart in FIG. 3.

Now referring to FIG. 3, a first switching sequence 300 having sequential steps 305 through 360 is illustrated. In step 305, second and third solid-state switches M2, M3, respectively, are controlled to be in an on state and first and fourth solid-state switches M1, M4 are controlled to be in an off state. A simplified schematic of switched regulation circuit 125 in step 305 is illustrated in FIG. 4. Second and third solid-state switches 140, 150, respectively are in an on state (solid lines) and first and fourth solid-state switches 130, 160, respectively are in an off state (dashed lines). Therefore, capacitor 170 is in a shorted condition, allowing any residual charge within the capacitor to dissipate such that the capacitor is discharged.

Now referring to timing diagram 800 in FIG. 8, first step 305 occurs at time t1. Trace 805 illustrates a control voltage applied to first solid-state switch 130. In the particular embodiment depicted in diagram 800, switches are turned on when approximately 1 volt is applied. At time t1 trace 805 is at approximately 0 volts thus first solid-state switch 130 is off. Trace 810 illustrates a control terminal voltage applied to second solid-state switch 140. At time t1 trace 810 is at approximately 1 volt thus second solid-state switch is on. Trace 815 illustrates a control terminal voltage applied to third solid-state switch 150. At time t1 trace 815 transitions to approximately 1 volt thus third solid-state switch 150 transitions from off to on. Trace 820 illustrates a control terminal voltage applied to fourth solid-state switch 160. At time t1 trace 820 is at approximately 0 volts thus fourth solid-state switch is off.

Trace 825 illustrates a voltage at second junction 145. At time t1, capacitor 170 is shorted. Trace 830 illustrates current through inductor 173. At time t1 inductor 173 is decoupled from the remainder of switched regulation circuit 125 thus the current in inductor 173 is zero. Trace 835 illustrates a comparator output corresponding to a zero current condition in inductor 173, as discussed in more detail below. Trace 840 illustrates the voltage across capacitor 170. At time t1 capacitor 170 is shorted causing the voltage across capacitor 173 to decrease as the capacitor is discharged.

Now referring back to FIGS. 3 and 4, after the controller sets the solid-state switches to their respective states identified in step 305, it advances to step 310 were it detects the voltage at output node 176 (Vout). In some embodiments Vout may be detected using comparator 195 (see FIG. 1) as discussed above, or by any other method. Advancing to step 315 the controller may detect if the voltage at output node 176 has decreased below a first threshold voltage ($V_{TH1}$). If Vout remains above $V_{TH1}$ then the controller continues to detect Vout (i.e., returns to step 310) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$. Myriad methods may be used to detect Vout, compare it to $V_{TH1}$ and notify the controller.

Figure 5:
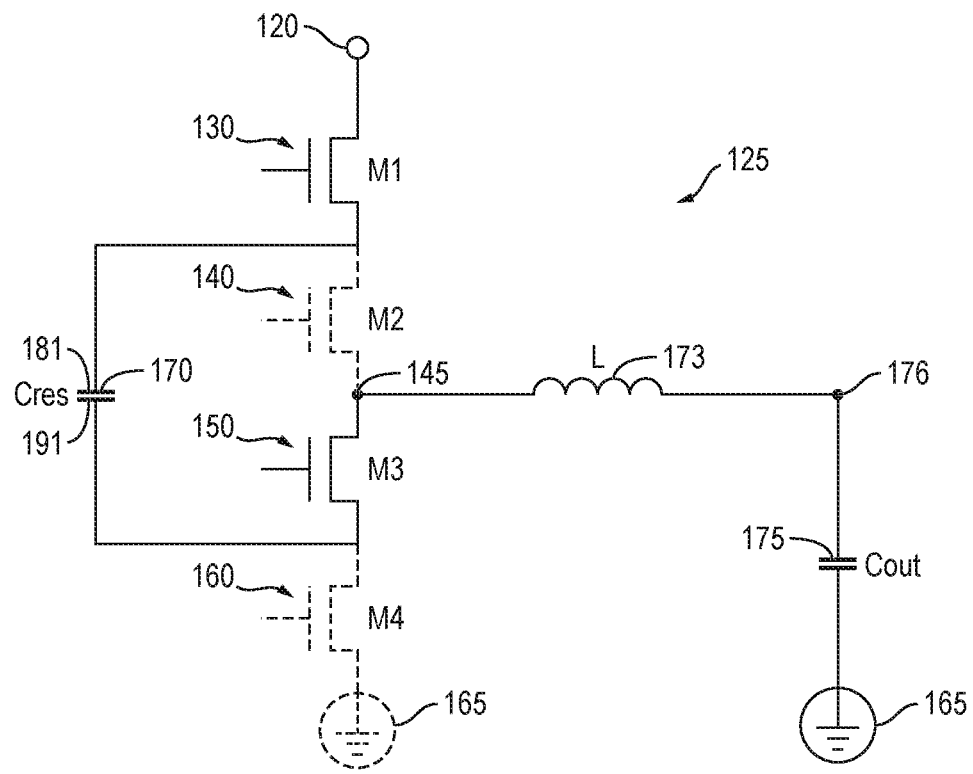
FIG. 5 is a schematic of the switched regulation circuit shown in FIG. 2 in a particular switch configuration according to the flowchart in FIG. 3.

Now referring back to FIG. 3, step 315, once Vout drops below $V_{TH1}$ the controller advances to step 320 where third solid-state switch M3 remains on while first solid-state switch M1 is turned on simultaneously with turning second solid-state switch M2 off. Thus, first and third solid-state switches, M1, M3, respectively, are on while second and fourth solid-state switches M2, M4, respectively, are off. A simplified schematic of switched regulation circuit 125 in step 320 is illustrated in FIG. 5. In this state the voltage at first terminal 120 (Vin) is applied directly to second junction 145. Capacitor 170 was fully discharged in the previous step and now begins to charge. Capacitor 170 charges with a time constant set by capacitor 170 and inductor 173 values.

Further, as capacitor 170 begins to charge, current flow in inductor 173 increases as the voltage between 145 and the output is positive.

Step 320 is illustrated in timing diagram 800 (see FIG. 8) at time t2. Now referring simultaneously to FIGS. 5 and 8, at time t2, first solid-state switch 130 (i.e., trace 805) turns on almost simultaneously with second solid-state switch 140 (i.e., trace 810) turning off. The voltage at second junction 145 (i.e., trace 825) increases rapidly to the voltage at first terminal 120 (Vin), in this application (or embodiment) approximately 2.5 volts. Between time t1 and t2 the voltage at second junction 145 may fluctuate At time t2, current in inductor 173 (i.e., trace 830) begins to increase. As capacitor 170 becomes charged (i.e., trace 840 approaches 2.5 volts), Voltage at 145 start to decrease. When the voltage at 145 goes below the load voltage 176, the current in inductor 173 (i.e., trace 830) starts to decrease. Thus, in step 320 capacitor 170 becomes charged, causing a current to flow in inductor 173, and increasing the voltage at output node 176 (Vout). The controller then proceeds to step 325 (see FIG. 3).

In step 325, the current in inductor 173 ($L_f$) is detected. In some embodiments the current may be detected as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. Referring now to step 330 in FIG. 3, once current in inductor 173 is approximately equal to zero, the controller proceeds to step 335 where first and third solid-state switches M1, M3, respectively, turn off and fourth solid-state switch M4 turns on while second solid-state switch M2 remains off. As discussed above, since the transition to step 335 only occurs when the current in inductor 176 is approximately zero, the transition to step 335 may employ zero current switching of first solid-state switch M1. Zero current switching occurs when the current through the solid-state switch is approximately zero, before changing the state of the switch. This reduces switching losses, reduces input supply noise, and improves the efficiency of switched regulation circuit 125, as discussed in more detail below.

Continuing to refer to step 335 in FIG. 3, in some embodiments the switching transitions may occur simultaneously while in other embodiments there may be slight delays between switch transitions. A simplified schematic of switched regulation circuit 125 in step 335 is illustrated in FIG. 6. Fourth solid-state switch 160 ties second side 191 of capacitor 170 to ground, however first side 181 of the capacitor is left floating such that the capacitor remains charged. This configuration is essentially an off state, where the system is substantially at steady-state. Other embodiments may have a different off state configuration. In one embodiment, all solid-state switches may be in an off position, while in further embodiments third solid-state switch 150 may be the only switch in an on state which connects capacitor 170 to inductor 173. In another embodiment both first and fourth solid-state switches 130, 160, respectively may be on simultaneously. Other off state solid-state switch configurations are within the scope of this disclosure.

Step 335 of FIG. 3 is illustrated in timing diagram 800 of FIG. 8, at time t3. Now referring simultaneously to FIGS. 6 and 8, at time t3 first and third solid-state switches, 130, 150, respectively, turn off and fourth solid-state switch 160 turns on while second solid-state switch 140 remains off. After the switching transitions, second junction 145 (i.e., trace 825) is disconnected from the solid-state switches and its voltage starts to increase. Capacitor 170 (i.e., trace 840) remains charged and the current in inductor 173 (i.e., trace 830) remains near zero. In step 340 the voltage at output node 176 (Vout) may be detected with comparator 195 (see FIG. 1) as discussed above in step 310. In other embodiments, Vout may be detected using a different method. As shown in step 345, the controller advances to step 350 when Vout drops below a second threshold voltage ($V_{TH2}$).

Now referring to FIG. 3, step 350, fourth solid-state switch M4 remains on and second solid-state switch M2 is turned on while first and third solid-state switches M1, M3, respectively, remain off. A simplified schematic of switched regulation circuit 125 in step 350 is illustrated in FIG. 7. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 starts to increase and voltage at output node 176 (Vout) increases. This condition is illustrated in timing diagram 800 in FIG. 8 at time t4.

Now simultaneously referring to FIGS. 7 and 8, at time t4 second solid-state switch 140 (i.e., trace 810) turns on. The voltage at second junction 145 (i.e., trace 825) makes an adjustment to approximately 2.5 volts as it is connected to fully charged capacitor 170. As capacitor 170 resonates with inductor 173, it discharges (i.e., trace 840) causing current to increase in inductor 173 (i.e., trace 830). This causes the voltage at Vout to increase. As the charge in capacitor 170 is reduced, current in inductor 173 decreases (i.e., trace 830). After configuring the solid-state switches, controller advances to steps 355 and 360 (see FIG. 3).

In step 355, the current in inductor 173 is detected. In some embodiments the current may be detected as illustrated in FIG. 1 with comparator 190. In further embodiments, comparator 190 (see FIG. 1) may be used to monitor the current through fourth semiconductor switch 160 and indirectly through inductor 173, by detecting a voltage differential between ground 165 and second side 191 of capacitor 170. For example, at time t5 in timing diagram 800 in FIG. 8, trace 835 illustrates a comparator output corresponding to a zero current condition in inductor 173. In other embodiments different methods may be used to detect current in inductor 173.

Referring now simultaneously to FIGS. 3 and 7, in step 360, once the current in inductor 173 is approximately equal to zero, the controller proceeds back to step 305, where third solid-state switch M3 is turned on and second solid-state switch M2 remains on while first solid-state switch M1 remains off and fourth solid-state switch M4 is turned off. Thus, M2 and M3 are on while M1 and M4 are off. This configuration shorts capacitor 170, repeating the entire switching sequence 300. As discussed above, since the current in inductor 173 and fourth solid-state switch M4 is at or near zero during the transition from step 360 to 305, zero current switching methods may be used to decrease switching losses, reduce input supply noise and improve efficiency, as discussed in more detail below.

In the particular switching sequence illustrated in FIG. 3, each solid-state switch turns on and off only once during each repetitive switching cycle. Such a sequence may enable improved efficiency by minimizing switching losses. In other embodiments, different switching configurations and sequences may be used where one or more switches may be turned on and off more than once.

As discussed above in FIG. 1, power regulator portion 105 and a load portion 110 may be monolithically integrated on unitary IC 100. In one embodiment unitary IC 100 may comprise silicon and first, second, third and fourth solid-state switches 130, 140, 150, 160 may be junction gate field effect devices (JFETs) while in other embodiments they may be metal-oxide semiconductor field-effect transistors (MOS-FETs), bi-polar devices or any other type of solid-state transistor. In further embodiments other materials may be used for unitary IC 100 such as silicon-germanium, silicon-carbide, gallium-nitride, gallium-arsenide and other materials. In one embodiment, unitary IC 100 may use a 28 nm and 40 nm fabrication process with an on die inductor in the range of 1-5 nH and an on die capacitor in the range of 100-300 pF, resulting in an on-time in the range of 1-5 ns.

In further embodiments, although solid-state switches 130, 140, 150 and 160 may be referred to in singular form, in some embodiments one or more of them may comprise more than one switch. More specifically, in one embodiment first solid state switch M1 may be made from two solid-state switches connected in series. In other embodiments one or more of the solid-state switches may comprise two or more solid-state switches that operate in conjunction with one another.

Figure 9:
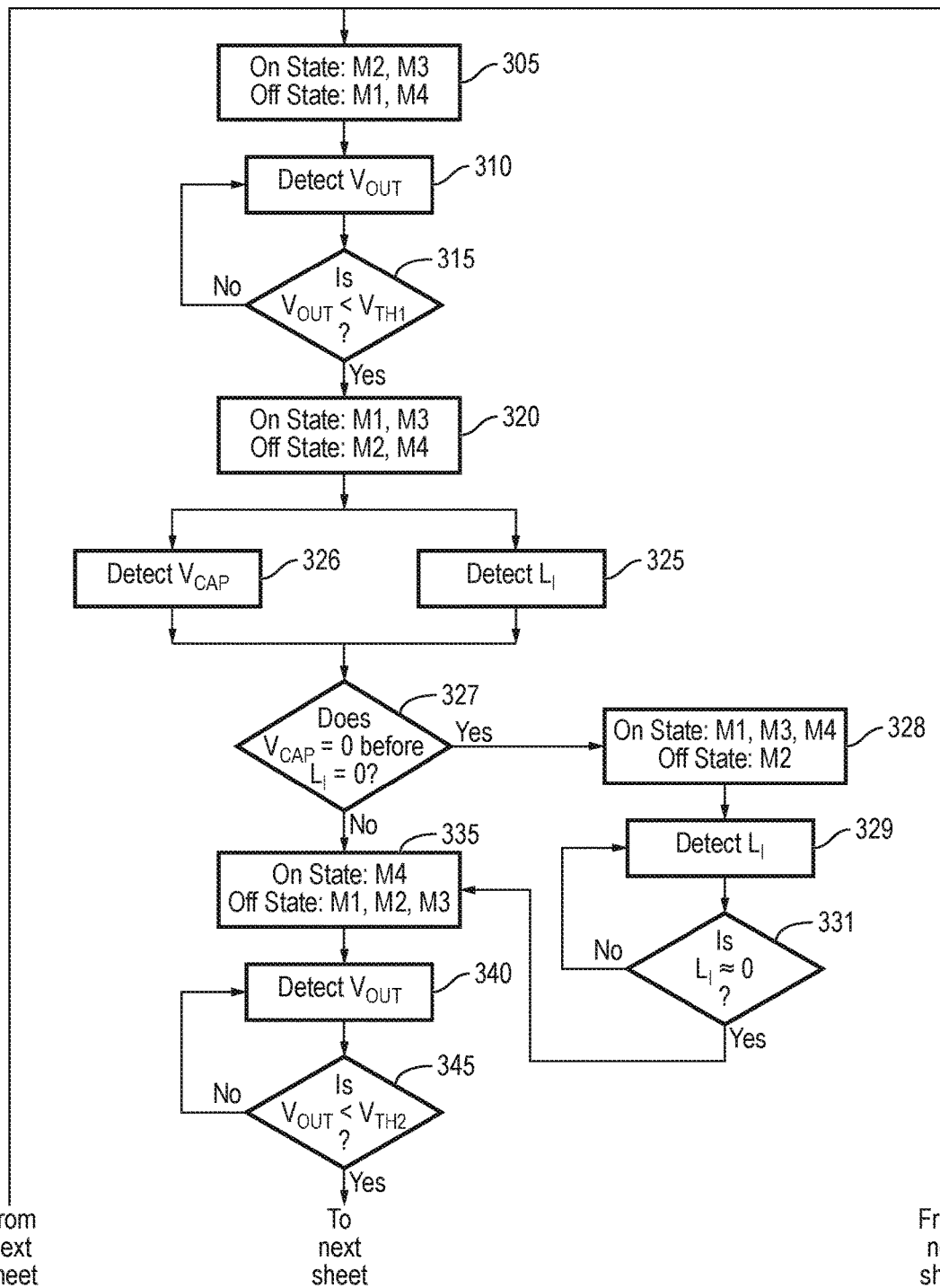
FIG. 9 is a is a flowchart of a repetitive switching sequence for the switched regulation circuit in FIG. 3 according to an embodiment of the invention.
Figure 9:
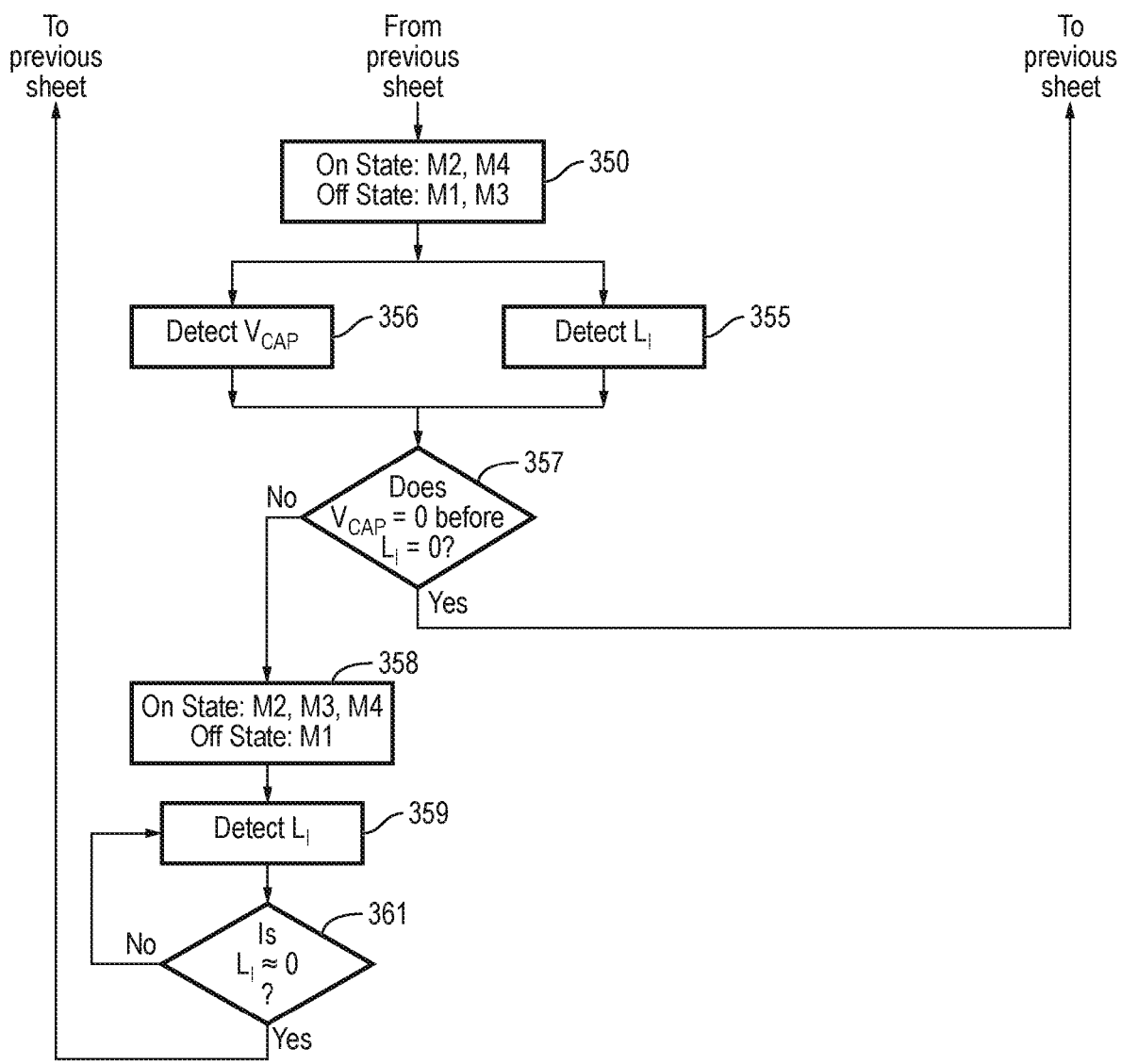
Figure 10:
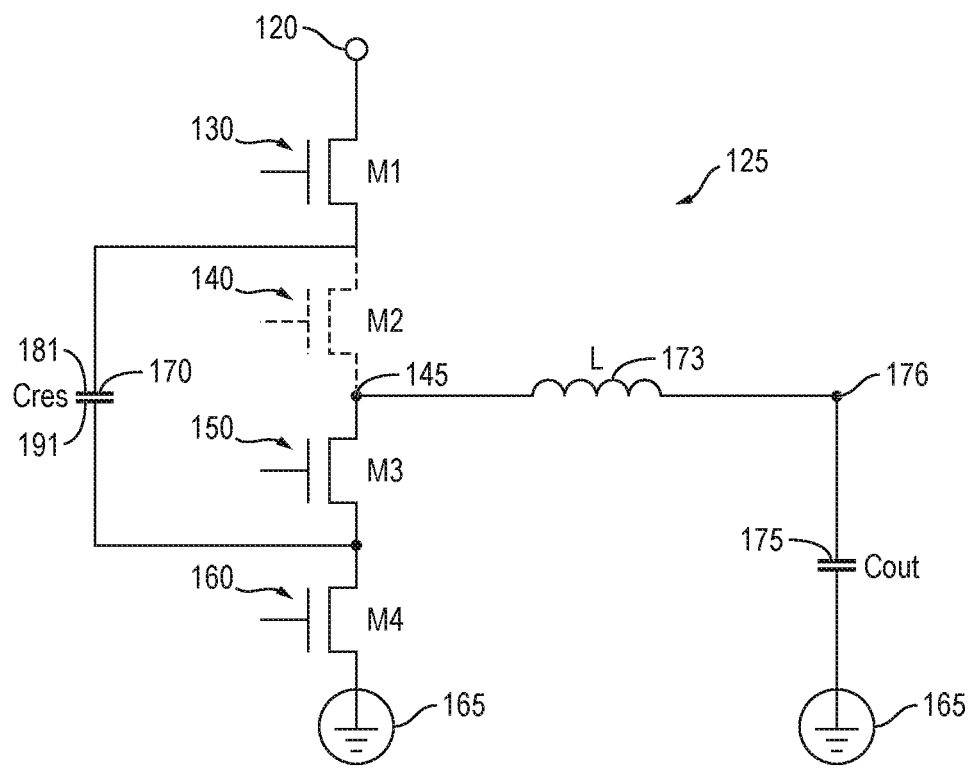
FIG. 10 is a schematic of the switched regulation circuit shown in FIG. 2 in a particular switch configuration according to the flowchart in FIG. 9.
Figure 11:
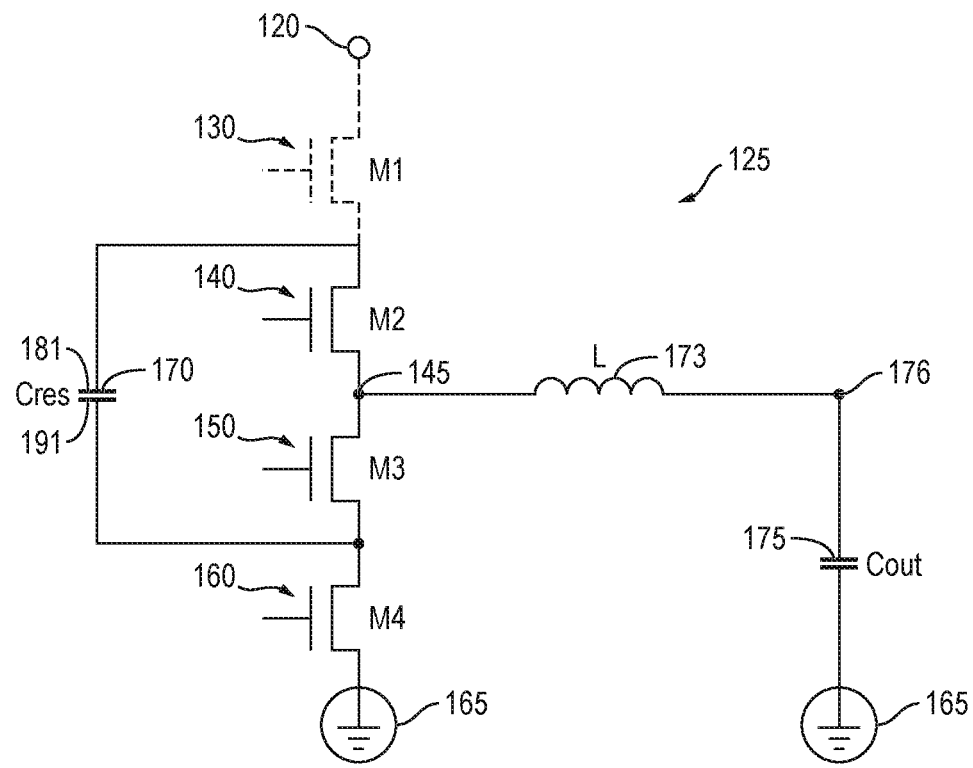
FIG. 11 is a schematic of the switched regulation circuit shown in FIG. 2 in a particular switch configuration according to the flowchart in FIG. 9.

Now referring to FIG. 9 another embodiment of a sequential switching sequence 900 is illustrated. Sequence 900 has many similar steps as sequence 300 in FIG. 3 such as steps 305-325 and 335-355. Thus steps that are the same between the sequences use the same reference numbers and the same schematics in FIGS. 4-7. However, sequence 900 has added steps including two added switch configurations, steps 328 and 358, the schematics for which are illustrated in FIGS. 10 and 11. Reference will now be made simultaneously to FIGS. 4-7 and 9-11.

Now referring to FIG. 9, a second switching sequence 900 having sequential steps 305 through 361 is illustrated. In step 305, second and third solid-state switches M2, M3, respectively, are controlled to be in an on state and first and fourth solid-state switches M1, M4 are controlled to be in an off state. A simplified schematic of switched regulation circuit 125 in step 305 is illustrated in FIG. 4. Second and third solid-state switches 140, 150, respectively are in an on state (solid lines) and first and fourth solid-state switches 130, 160, respectively, are in an off state (dashed lines). Therefore, capacitor 170 is in a shorted condition, allowing any residual charge within the capacitor to dissipate such that the capacitor is discharged.

Now referring back to FIGS. 3 and 4, after the controller sets the solid-state switches to their respective states identified in step 305, it advances to step 310 were it detects the voltage at output node 176 (Vout). In some embodiments the voltage at output node 176 (Vout) may be detected using comparator 195 (see FIG. 1) as discussed above, or by any other method. Advancing to step 315 the controller may detect if the voltage at output node 176 has decreased below a first threshold voltage ($V_{TH1}$). If Vout remains above $V_{TH1}$ then the controller continues to detect Vout (i.e., returns to step 310) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$ and respond accordingly. Myriad methods may be used to detect Vout, compare it to $V_{TH1}$ and notify the controller.

Now referring back to FIG. 9, step 315, once Vout drops below $V_{TH1}$ the controller advances to step 320 where third solid-state switch M3 remains on while first solid-state switch M1 is turned on simultaneously with turning second solid-state switch M2 off. Thus, first and third solid-state switches, M1, M3, respectively, are on while second and fourth solid-state switches M2, M4, respectively, are off. A simplified schematic of switched regulation circuit 125 in step 320 is illustrated in FIG. 5. In this state the voltage at first terminal 120 (Vin) is applied directly to second junction 145. Capacitor 170 was fully discharged in the previous step and now begins to charge. Capacitor 170 charges with a time constant set by capacitor 170 and inductor 173 values. Further, as capacitor 170 begins to charge, current flow in inductor 173 increases then decrease.

In some embodiments, steps 325 and 326 may occur simultaneously using one or more comparators or other techniques, as discussed in more detail below. In step 325, the current in inductor 173 ($L_I$) is detected. In some embodiments this may be performed as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. In step 326 the voltage drop across capacitor 170 ($V_{CAP}$) is detected, using one or more comparators, as discussed above. More specifically the controller is configured to continue charging the capacitor until a voltage potential on the second junction is approximately 0 volts. In step 327 the controller determines if the voltage on capacitor ($V_{CAP}$) 170 is zero volts before current in inductor 173 is zero. More specifically, during steps 320, 325, 326 and 327, capacitor 170 is being charged and once it reaches full charge (i.e., voltage on capacitor 170 is zero) the controller determines if there is still current flowing in inductor 170. If there is still current in inductor 170, the controller proceeds to step 328, however it there is no current in the inductor then it proceeds to step 335.

Proceeding now to step 328, assuming the condition $L_I>0$ when $V_{CAP}=0$, first and third solid-state switches M1, M3 remain on while fourth solid-state switch M4 is turned on simultaneously with turning second solid-state switch M2 off. Thus, first, third and fourth solid-state switches, M1, M3 and M4, respectively, are on while second solid-state switch M2 is off. In some embodiments, M4 may be turned on slowly so that the current in M1 is slowly reduced so as to reduce the amount of supply noise. A simplified schematic of switched regulation circuit 125 in step 328 is illustrated in FIG. 10. In this state inductor 173 is shorted to ground 165, resulting in a rapid discharge of any remaining current within it. After configuring the solid-state switches, controller advances to steps 355 and 360 (see FIG. 9).

In step 329, the current in inductor 173 is detected. In some embodiments the current may be detected as illustrated in FIG. 1 with comparator 190. In some embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 3 and 7, in step 331, once the current in inductor 173 is approximately equal to zero, the controller proceeds to step 335. In summary, steps 328, 329 and 331 discharge the remaining current in inductor 170 and transition to the waiting state in step 335.

Referring now back to step 327, assuming condition $L_I=0$ (i.e., there is no current in inductor 170), instead of going to step 328, the controller goes directly to step 335 where first and third solid-state switches M1, M3, respectively, turn off and fourth solid-state switch M4 turns on while second solid-state switch M2 remains off. Thus, M4 is on while M1, M2 and M3 are off. As discussed above, since the transition to step 335 only occurs when the current in inductor 176 is approximately zero, the transition to step 335 may employ zero current switching of first solid-state switch M1. Zero current switching occurs when the current through the solid-state switch is approximately zero, before changing the state of the switch. This reduces switching losses, reduces input supply noise and improves the efficiency of switched regulation circuit 125, as discussed in more detail below.

Continuing to refer to step 335 in FIG. 9, in some embodiments the switching transitions may occur simultaneously while in other embodiments there may be slight delays between switch transitions. A simplified schematic of switched regulation circuit 125 in step 335 is illustrated in FIG. 6. Fourth solid-state switch 160 ties second side 191 of capacitor 170 to ground, however first side 181 of the capacitor is left floating such that capacitor remains charged. This configuration is essentially an off state, where the system is substantially at steady-state. Other embodiments may have a different off state configuration. In one embodiment, all solid-state switches may be in an off position, while in further embodiments third solid-state switch 150 may be the only switch in an on state which connects capacitor 170 to inductor 173. In another embodiment both first and fourth solid-state switches 130, 160, respectively may be on simultaneously. Other off state solid-state switch configurations are within the scope of this disclosure.

After the switches are configured in step 335 the controller advances to step 340 where the voltage at output node 176 (Vout) may be detected with comparator 195 (see FIG. 1) as discussed above in step 310. In other embodiments, Vout may be detected using a different method. As shown in step 345, the controller advances to step 350 when the voltage at output node 176 (Vout) drops below a second threshold voltage ($V_{TH2}$).

Now referring to FIG. 9, step 350, fourth solid-state switch M4 remains on and second solid-state switch M2 is turned on while first and third solid-state switches M1, M3, respectively, remain off. A simplified schematic of switched regulation circuit 125 in step 350 is illustrated in FIG. 7. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 starts to increase and voltage at output node 176 (Vout) increases.

In some embodiments, steps 355 and 356 may occur simultaneously. After configuring the solid-state switches, the controller advances to step 355 where the current in inductor 173 is detected and 356 where the voltage drop across capacitor 170 ($V_{CAP}$) is detected, as discussed above. More specifically, in one embodiment controller may continue discharging the capacitor until a voltage potential on the second junction is approximately 0 volts. Then, in step 357 the controller determines if the voltage across capacitor ($V_{CAP}$) 170 is zero volts before current in inductor 173 is zero. More specifically, during steps 350, 355, 356 and 357, capacitor 170 is being discharged and once it reaches near zero charge the controller determines if there is still current flowing in inductor 170. If there is no current in inductor 170, the controller proceeds back to the beginning of the switching sequence, step 305. However, if there is still current in inductor 170 then the controller proceeds to step 358.

Proceeding now to step 358, assuming the condition $L_I>0$ when $V_{CAP}=0$ volts (i.e., there is still current in the inductor when the capacitor is discharged), second and fourth solid-state switches M2, M4, respectively, remain on while third solid-state switch M3 is turned on and first solid-state switch M1 is off. Thus, second, third and fourth solid-state switches, M2, M3 and M4 respectively, are on while first solid-state switch M1 is off. A simplified schematic of switched regulation circuit 125 in step 358 is illustrated in FIG. 11. In this state inductor 173 is shorted to ground 165, resulting in a rapid discharge of any remaining current within it. After configuring the solid-state switches, controller advances to steps 359 and 361 (see FIG. 9).

In step 359, the current in inductor 173 is detected. In some embodiments the current may be detected as illustrated in FIG. 1 with comparator 190. In some embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 7 and 9, in step 361, once the current in inductor 173 is approximately equal to zero, the controller proceeds back to step 305, where third solid-state switch M3 is turned on and second solid-state switch M2 remains on while first solid-state switch M1 remains off and fourth solid-state switch M4 is turned off. Thus, M2 and M3 are on while M1 and M4 are off. This configuration shorts capacitor 170, repeating the entire switching sequence 900. As discussed above, since the current in inductor 173 and fourth solid-state switch M4 is zero during the transition from step 361 to 305, zero current switching methods may be used to decrease switching losses, reduce input supply noise and improve efficiency, as discussed in more detail below.

In the particular switching sequence illustrated in FIG. 9, each solid-state switch turns on and off only once during each repetitive switching cycle. Such a sequence may enable improved efficiency by minimizing switching losses. In other embodiments, different switching configurations and sequences may be used where one or more switches may be turned on and off more than once. Other embodiments may use switching sequences where one or more on the solid-state switches are turned on and off more than once per switching cycle.

Some embodiments may employ one or more comparators such as comparators 187, 190, 193, 195 in FIG. 1 to provide information to the controller to operate switched regulation circuit 125 (see FIG. 1). Further embodiments may use a combination of comparators and timers to operate switched regulation circuit 125. More specifically, with knowledge of certain switched regulation circuit 125 parameters reasonably accurate timers may be used in the place of comparators to trigger the controller to change switch configurations. In one embodiment, with knowledge of one or more electrical characteristics of switched regulation circuit 125, such as for example, Vin, Vout, inductance of inductor 17 or capacitance of capacitor 170, one or more timers may be used to estimate one or more electrical characteristics of the switched regulation circuit, such as for example current in inductor or voltage on capacitor, and trigger the transitions between switch configurations. In some embodiments, timers may be faster and easier to implement than comparators. In one embodiment, only one comparator may be used to look at Vout, and timers may be used for all other transitions.

Multiple circuit characteristics are discussed above and as discussed one or more of these characteristics may be used to determine when to change a state of the switches such as, but not limited to, Vcap, Vout, Vin and Li. In such embodiments the circuit characteristics may be continuously monitored and decisions may be made at particular times during each switch sequence as noted in the flow charts. Further, the waveforms shown in the timing diagrams, such as FIG. 8 are for illustration only and the actual waveforms may be different.

As discussed above, in some switching transitions zero current switching may be used. As used herein, zero current switching means that the solid-state switch may be turned off only when the current running through the switch is at or near zero. Switching losses (i.e., turning a switch off while it is conducting current or turning a switch on when it has a voltage potential across it) may be a significant contributor to power loss in the system. Thus, the use of zero current switching may result in reduced switching losses, increased frequency of operation and in some embodiments, reduced electromagnetic interference (EMI) generation, as discussed in more detail below.

Figure 12:
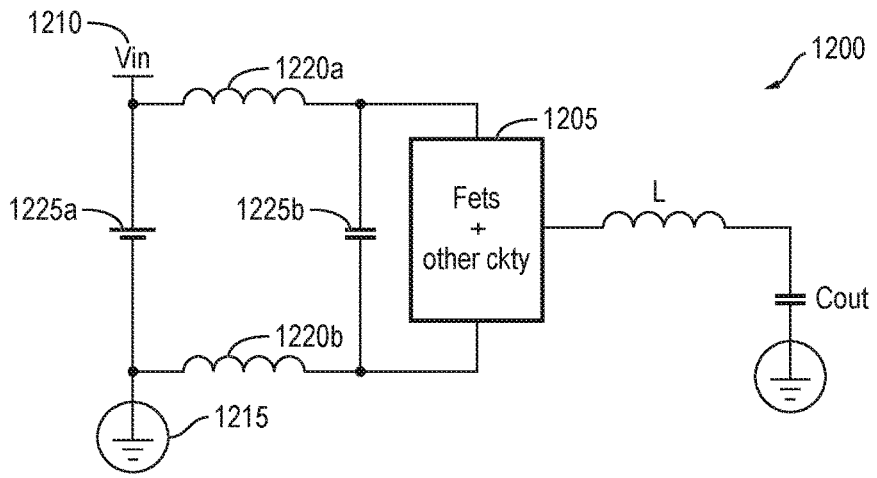
FIG. 12 is a schematic of a switched regulation circuit with parasitic elements according to an embodiment of the invention.

Now referring to FIG. 12, in some embodiments zero current switching and the solid-state switching transition speed may be reduced to suppress input supply noise (i.e., a type of EMI) as described in more detail below. FIG. 12 shows a simplified schematic 1200 of a power regulator circuit 1205 containing FETs and other circuitry that is powered by an input supply 1210 (Vin) and grounded to a ground terminal 1215. In one embodiment, power regulator circuit 1205 may be disposed on a unitary die that is encapsulated in a semiconductor package. First and second inductors 1220a, 1220b, respectively, represent the parasitic inductance associated with the power connections to power regulator circuit 1205. Parasitic inductance may result from traces on a circuit board, interconnects within an electronic package, wire bonds to a die, traces on an integrated circuit or any other conductor. Capacitor 1225a represents parasitic capacitance between the power supply lines on the supply side and capacitor 1225b represents parasitic capacitance between the input and the output power supply lines on the receiving side.

During operation of power regulator circuit 1205, first and second parasitic inductors 1220a, 1220b, respectively, cannot immediately cease carrying current when the power regulator stops drawing current from input supply 1210 (Vin), such as for example when M1 (see FIG. 1) switches off. When M1 shuts off abruptly while carrying current, the residual energy within first and second parasitic inductors 1220a, 1220b, may ring with one or more components within power regulator circuit 1205.

To minimize or reduce the ringing (i.e., input supply noise), zero current switching may be used, where the current in first and second parasitic inductors 1220a, 1220b, respectively is brought to near zero before turning off M1. Such transitions are described in more detail above where current in the circuit may be detected and the switch is operated once the current has decayed to approximately zero. In other embodiments, the abrupt transition from carrying current through M1 to M1 opening and immediately ceasing carrying current may be slowed, by transitioning M1 more slowly from the on state to the off state. More specifically, in one embodiment if there is residual current in inductor 173, M4 may be turned on to dissipate the current in the inductor. However, if the current transitions too quickly from M1 to M4 noise may be created in the system. Thus, in some embodiments M4 may be turned on relatively slowly so the current may slowly transition from going through M1 to going through M4, creating a "quieter" switching transition. In one example embodiment, a transistor may be fabricated with a 28 nm process having a normal solid-state switching transition speed of approximately 10 ps. To reduce ringing, in one embodiment a slowed transition may be approximately ten times slower at 100 ps. In further embodiments the slowed transition may be between five times and fifteen times slower. In other embodiments, the slowed transition may be between 3 times and 17 times slower, as compared to a normal transition time. The slower transition turning M1 off may allow the current be slowly reduced in first and second parasitic inductors 1220a, 1220b, such that the ringing with on chip components is minimized or eliminated.

In further embodiments, zero current switching and the power regulation circuits disclosed herein may enable switching speeds that operate between 1 MHz and 500 MHz. In other embodiments the switching speed may be between 50 MHz and 200 MHz. In further embodiments the switching speed may be approximately 100 MHz.

Figure 13:
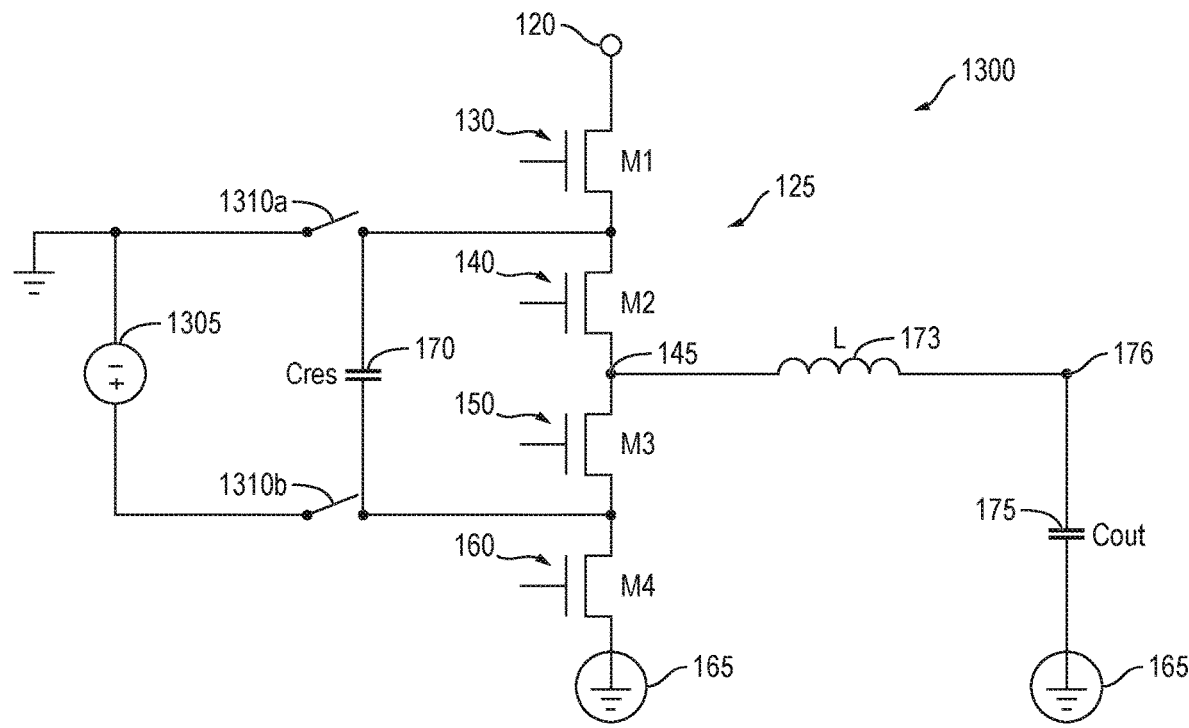
FIG. 13 is a schematic of the switched regulation circuit shown in FIG. 2 with an added power supply coupled to the circuit with a pair of switches according to an embodiment of the invention.

Now referring to FIG. 13, in further embodiments a boost circuit 1300 may be made by combining switched regulation circuit 125 with a power supply 1305 that is coupled to capacitor 170 with first and second solid-state switches 1310a, 1310b, respectively. In this embodiment capacitor 170 may be precharged by power supply 1305 such that when the capacitor is connected to input terminal 120 (Vin) it acts like a battery and increases or decreases the voltage potential supplied to switched regulation circuit 125. In one example embodiment, capacitor 170 may be precharged to −2 volts, such that when the switching sequence starts and the capacitor and inductor are connected to first terminal 120 (Vin) at 2.5 volts, a potential of 4.5 volts is applied to the capacitor and the inductor.

More specifically, referring to FIG. 3, step 305 and FIG. 9, step 305, instead of shorting capacitor 170 and completely discharging it, the capacitor may alternatively be coupled to power supply 1305 where it is precharged, such that in step 320 in FIGS. 3 and 9 when the capacitor is connected to Vin, the voltage applied to capacitor 170 and inductor 176 may be higher than Vin. In other embodiments the precharging may be used to increase the range of switched regulation circuit 125 when not operating under boost. Other configurations and variations of switched regulation circuit 125 and methods of precharging the capacitor are within the scope of this disclosure. For example, in one embodiment the power supply that is used for the precharging may be located on the same die as switched regulation circuit 125. In some embodiments the power supply may be a low drop out regulator, a switched capacitor or a switching regulator that are on the same die. In other embodiments the power supply may not be located on the same die as switched regulation circuit 125.

Regulator with Inductor Preflux

In another embodiment a switched regulation circuit 125 (see FIG. 2) may be configured to preflux the inductor 173 such that the switched regulation circuit may deliver an increased output voltage and/or increased output current, as discussed in more detail below.

Figure 14:
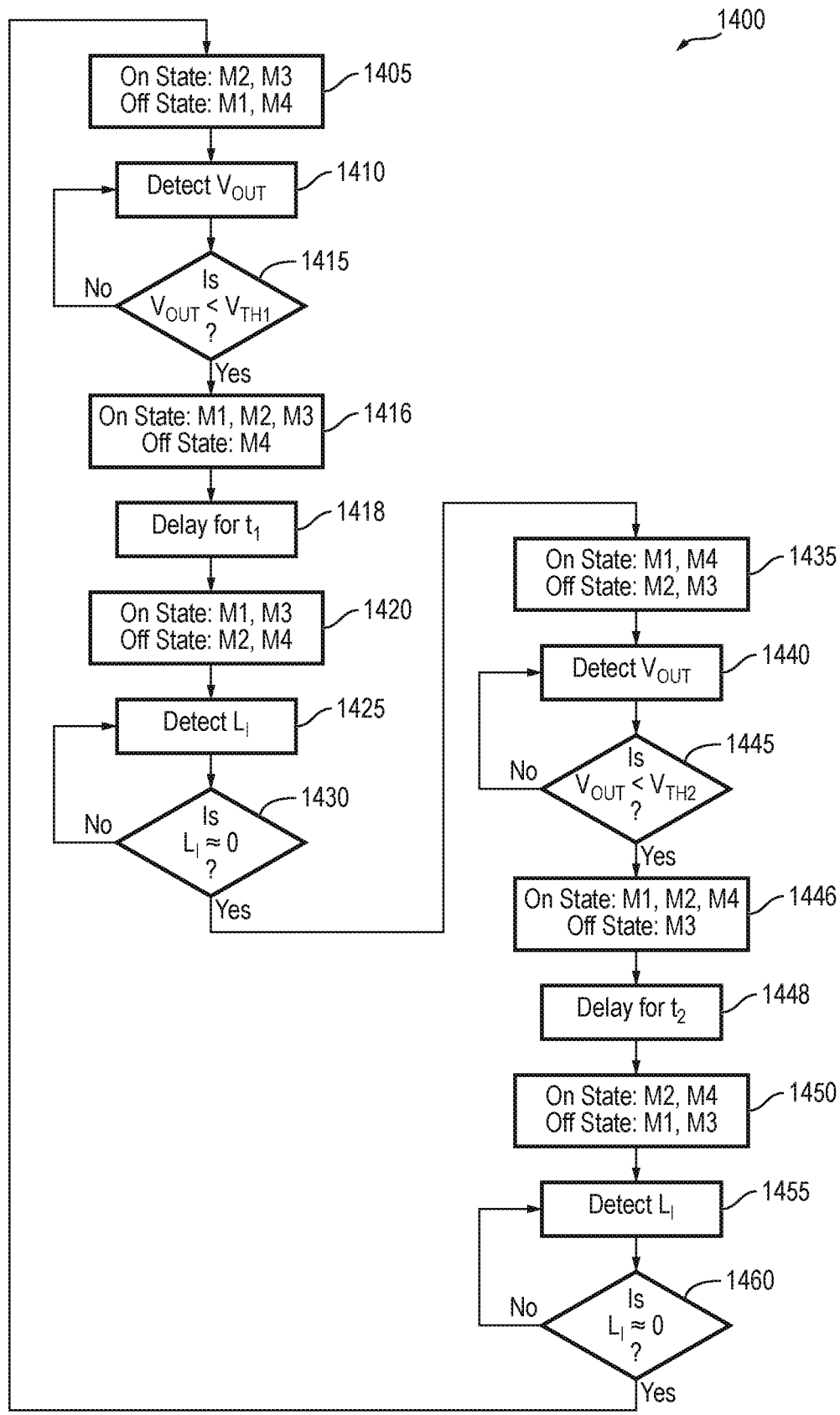
FIG. 14 is a flowchart of a repetitive switching sequence for the switched regulation circuit in FIG. 2 according to an embodiment of the invention.
Figure 15:
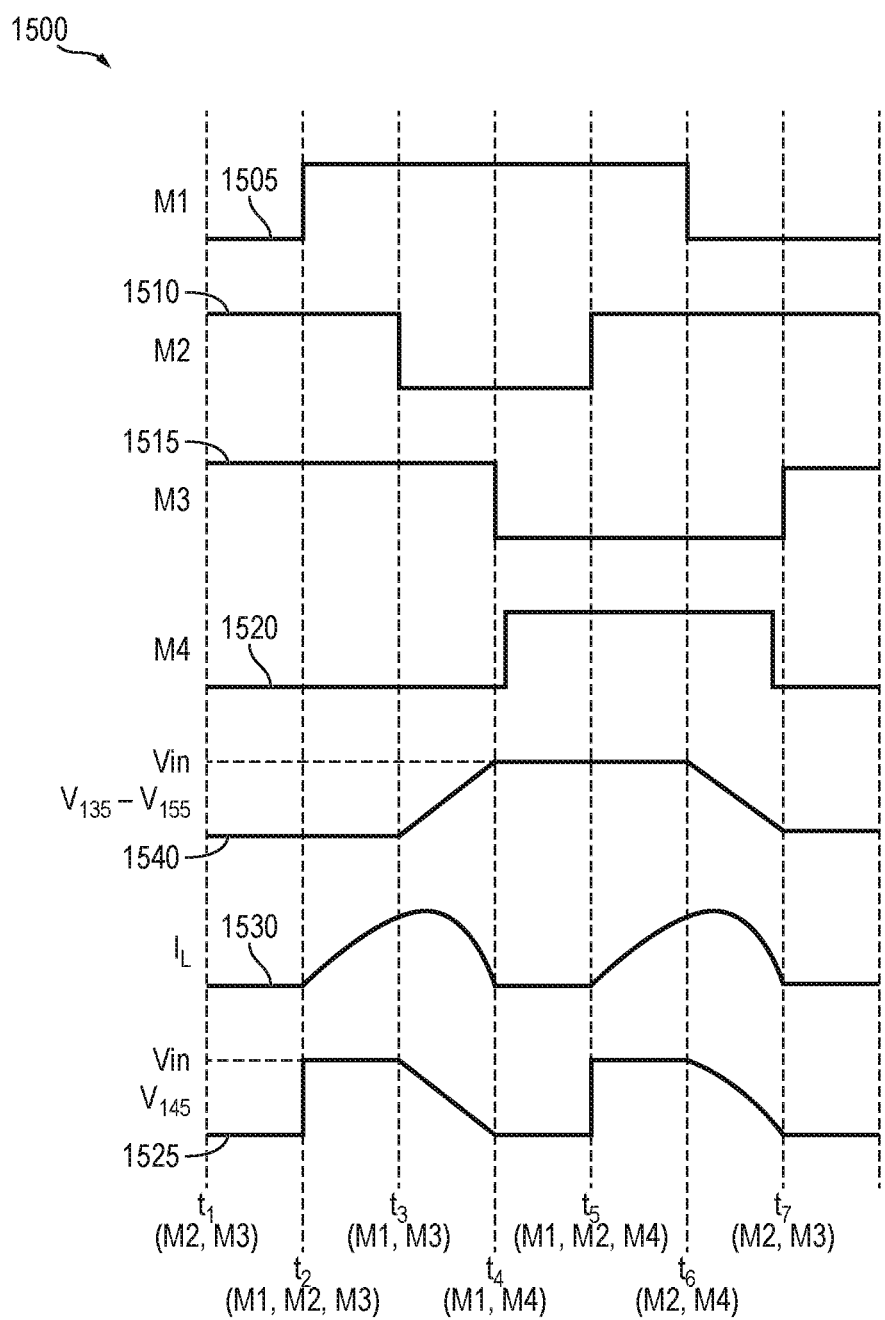
FIG. 15 is a timing diagram of voltages and currents within the switched regulation circuit of FIG. 2 according to the switching sequence in FIG. 14.

Now referring simultaneously to FIGS. 2, 14 and 15 an embodiment of a switching sequence and timing diagram for switched regulation circuit 125 with inductor preflux is illustrated. More specifically, FIG. 2 illustrates a simplified schematic of the switched regulation circuit 125, FIG. 14 illustrates a switching sequence 1400 having sequential steps 1405 through 1460 for the four switches in switched regulation circuit and FIG. 15 illustrates an example timing diagram, showing the control signals delivered to each of the four solid-state switches as well as the voltage at second junction 145, the current within inductor 173 ($I_L$), and the voltage across capacitor 170 ($V_{135}$-$V_{155}$). The switching sequence illustrated in FIGS. 14 and 15 is for example only and other sequences, timings and configurations are within the scope of this disclosure.

Now referring to FIG. 14, a switching sequence 1400 having sequential steps 1405 through 1460 is illustrated. In step 1405, second and third solid-state switches M2, M3, respectively, are controlled to be in an on state and first and fourth solid-state switches M1, M4 are controlled to be in an off state. Capacitor 170 is in a shorted condition, allowing any residual charge within the capacitor to dissipate such that the capacitor is discharged.

Example currents and voltages within switched regulation circuit 125 for step 1405 are illustrated in timing diagram 1500 in FIG. 15. For signals M1, M2, M3, M4, the logic levels are indicated. A logic high level (sometimes noted as 1) indicates the switch (or composite switch) is on, a logic low (sometimes noted as 0) indicates the switch is off. First step 1405 occurs at time t1. Trace 1505 illustrates a control signal applied to first solid-state switch 130. In the particular embodiment depicted in diagram 1500, switches are turned on when approximately 1 volt is applied. At time t1 trace 1505 is at approximately 0 volts thus first solid-state switch 130 is off. Trace 1510 illustrates a control terminal voltage applied to second solid-state switch 140. At time t1 trace 1510 is at approximately 1 volt thus second solid-state switch is on. Trace 1515 illustrates a control terminal voltage applied to third solid-state switch 150. At time t1 trace 1515 is approximately 1 volt thus third solid-state switch 150 is on. Trace 1520 illustrates a control terminal voltage applied to fourth solid-state switch 160. At time t1 trace 1520 is at approximately 0 volts thus fourth solid-state switch is off.

Trace 1525 illustrates a voltage at second junction 145. At time t1, capacitor 170 is shorted so there is approximately 0 volts at second junction 145. Trace 1530 illustrates current through inductor 173. At time t1 inductor 173 is decoupled from the remainder of switched regulation circuit 125 thus the current in inductor 173 is approximately zero. Trace 1540 illustrates the voltage across capacitor 170. At time t1 capacitor 170 is shorted causing the voltage across capacitor 173 to decrease to approximately zero volts as the capacitor is discharged.

Now referring back to FIG. 14, after the controller sets the solid-state switches to their respective states identified in step 1405, it advances to step 1410 were it detects the voltage at output node 176 (Vout). In some embodiments Vout may be detected using comparator 195 (see FIG. 1) as discussed above, or by any other method. Advancing to step 1415 the controller may detect if the voltage at output node 176 has decreased below a first threshold voltage ($V_{TH1}$). If Vout remains above $V_{TH1}$ then the controller continues to detect Vout (i.e., returns to step 1410) until Vout drops below $V_{TH1}$. In some embodiments the controller may cyclically detect Vout then compare it to $V_{TH1}$, while in other embodiments the controller may respond to a signal, such as from a comparator, that Vout has decreased below $V_{TH1}$. Myriad methods may be used to detect Vout, compare it to $V_{TH1}$ and notify the controller.

Now referring back to FIG. 14, step 1415, once Vout drops below $V_{TH1}$ the controller advances to step 1416 where first solid-state switch M1 is turned on, second and third solid-state switches M2 and M3 remain on and fourth solid-state switch M4 remains off. Step 1416 is the first inductor prefluxing state where current in the inductor is linearly increased by the application of a voltage at first output terminal 120 (Vin) to the inductor before capacitor 170 is charged. The prefluxing step enables switched regulation circuit 125 circuit to deliver increased output voltage and/or output current as compared to the switching configurations described above. In this state the voltage at first terminal 120 (Vin) is applied directly across inductor 173.

Now referring to timing diagram 1500, the first prefluxing state is shown at t2. The voltage at second junction 145 rapidly increases to the Vin voltage (minus a relatively small voltage drop across M1 and M2) at first node 120 shown by trace 1525. Current in inductor 170 (trace 1530) increases rapidly, corresponding to the applied voltage and the characteristics of inductor 173. For some embodiments, the voltage at 176 may change a relatively small amount compared with the voltage across the inductor and thus the current may increase substantially linear at a rate approximated by Vin-Vout where Vout is the voltage at 176. The current in inductor 173 continues until the switch state is changed, which in one embodiment may be controlled by a timer shown in step 1418. In some embodiments the timer in step 1418 may be a variable timer that can use a lookup table to adjust according to different load conditions and demands on switched regulation circuit 125. In further embodiments the timer in step 1418 may be variable and may be controlled by a feedback loop based on one or more characteristics of switched regulation circuit 125. In some embodiments the timer may be adjusted by the feedback loop to energize inductor 173 with an appropriate amount of current so that the inductor current resonates to zero just when capacitor 170 becomes fully charged (discussed in the next step 1420).

In some embodiments, the timer can be made utilizing a current on a capacitor. That current starts charging at the beginning of the preflux cycle and may be compared to a voltage. When the voltage on the capacitor reaches a specified voltage the timer indicates that the preflux cycle should end. In other embodiments this function can be done utilizing logic gates. Other timers disclosed herein may use similar techniques.

In one embodiment a feedback loop may be used to monitor the current in inductor 173 and adjust the timer. In some embodiments, if the current is still positive when capacitor 170 becomes fully charged, the timer may be reduced for the next charging cycle. Conversely, if the current in inductor 173 goes to zero before capacitor 170 becomes fully charged, the timer may be increased for the next cycle. In some embodiments, the loop may use an analog loop. In some embodiments, a DAC can be used to adjust the timer by changing one or more of a current, a capacitor, a voltage threshold on a comparator or a numbers of logic gates.

In some embodiments, instead of a timer for setting the preflux, the current can be monitored during preflux and have the preflux cycles end when the current reaches a specified level. That specified level can be adjusted on a cycle by cycle basis to optimize performance. That performance can be to reach a specified average current supplied or so that the voltage on the capacitor and current in the inductor reaches zero at approximately the same time. Other timers disclosed herein may use similar techniques.

In further embodiments that employ a soft braking methodology, discussed in more detail below, the timer can be set to be at least as long as needed to preflux inductor 173 so the current never reaches zero before capacitor 170 is fully charged and soft braking can be used to transition the remaining current in inductor 173. Other embodiments may use different techniques to control the timer and are within the scope of this disclosure.

Now referring back to FIG. 14, after the timer has run, the controller advances to step 1420 where first and third solid-state switches M1 and M3 remain on while the second solid-state switch M2 is turned off and the fourth solid-state switch remains off. Thus, first and third solid-state switches, M1, M3, respectively, are on while second and fourth solid-state switches M2, M4, respectively, are off. In this state the voltage at first terminal 120 (Vin) is applied directly to second junction 145. Capacitor 170 was fully discharged in the step 1405 and now begins to charge. Capacitor 170 charges with a time constant set by capacitor 170 and inductor 173 values. Further, as capacitor 170 begins to charge, current flow in inductor 173 increases as the voltage between 145 and the output is positive. Because of the prefluxing operation in step 1416, the current that was already flowing in inductor 173 continues to increase, as discussed in more detail below.

Step 1420 is illustrated in timing diagram 1500 (see FIG. 1500) at time t3. Now referring simultaneously to FIGS. 2 and 15, at time t3, second solid-state switch 140 (i.e., trace 1510) turns off. The voltage at second junction 145 (i.e., trace 1525) begins to decrease. Current in inductor 173 (trace 1530) continues to build as capacitor 170 charges. Voltage in capacitor 170 (trace 1540) increases towards Vin. As capacitor 170 becomes charged the current in inductor 173 (trace 1530) slows and reverses when the voltage at node 145 equals the voltage at 176 and reaches approximately zero when the capacitor is fully charged at t4. Thus, in step 1520 capacitor 170 charges, causing a current to flow in inductor 173, and increasing the voltage at output node 176 (Vout). The controller then proceeds to step 1425 (see FIG. 14).

In step 1425, the current in inductor 173 (LI) is detected. In some embodiments the current may be detected as illustrated in FIG. 1 with comparator 187. In one embodiment comparator 187 monitors current flow through first solid-state switch 130 by comparing a voltage difference between first terminal 120 and first side 181 of capacitor 170. As the voltage difference decreases, the current commensurately decreases in both first solid-state switch 130 and inductor 173. Referring now to step 1430 in FIG. 14, once current in inductor 173 is approximately equal to zero, the controller proceeds to step 1435. In the timing diagram 1425 and 1430 are shown as discrete steps, while in one embodiment, the current in Li can be continuously monitored during the 1420 conduction cycle. In further embodiments steps 1425 and 1455 can be similar to steps 356 and 355 in FIG. 9 where both inductor current and capacitor voltage are monitored.

In step 1435, third solid-state switch M3 turns off and fourth solid-state switch M4 turns on while second solid-state switch M2 remains off. As discussed above, since the transition to step 1435 only occurs when the current in inductor 176 is approximately zero, the transition to step 1435 may employ zero current switching. Zero current switching occurs when the current through the solid-state switch is approximately zero, before changing the state of the switch. This reduces switching losses, reduces input supply noise, and improves the efficiency of switched regulation circuit 125, as discussed in more detail below.

Continuing to refer to step 1435 in FIG. 14, in some embodiments the switching transitions may occur simultaneously while in other embodiments there may be slight delays between switch transitions. In the embodiment illustrated in FIG. 15, at t4 switch M4 may have a slight delay such that it turns on after M3 turns off. This configuration is essentially an off state, where the system is substantially at steady-state. Other embodiments may have a different off state configuration. In some embodiments only M4 may be on while M1, M2 and M3 are off. In further embodiments, all solid-state switches may be in an off position, while in other embodiments third solid-state switch 150 may be the only switch in an on state which connects capacitor 170 to inductor 173. Other off state solid-state switch configurations are within the scope of this disclosure.

Step 1435 of FIG. 14 is illustrated in timing diagram 1500 of FIG. 15, at time t4. Now referring simultaneously to FIGS. 2 and 15, at time t4 third solid-state switch 150 turns off and fourth solid-state switch 160 turns on slightly afterwards. First solid-state switch 130 remains on and second solid-state switch 140 remains off. After the switching transitions, second junction 145 (i.e., trace 1525) remains at approximately 0 volts. Voltage across capacitor 170 (i.e., trace 1540) remains at a charged level and the current in inductor 173 (i.e., trace 1530) remains near zero. In step 1440 the voltage at output node 176 (Vout) may be detected with comparator 195 (see FIG. 1) as discussed above in step 1410. In other embodiments, Vout may be detected using a different method. As shown in step 1445, the controller advances to step 1446 when Vout drops below a second threshold voltage ($V_{TH2}$).

Now referring to FIG. 14, step 1446, first fourth solid-state switches, M1 and M4 remain on, second solid-state switch M2 turns on, and third solid-state switches M3 remains off. This is the second inductor prefluxing stage where current in inductor 173 is increased by applying voltage at first output terminal 120 (Vin) to the inductor before the energy within capacitor 170 is discharged to the inductor. The prefluxing step enables switched regulation circuit 125 circuit to deliver increased output voltage and/or output current as compared to the switching configurations described above. In this state the voltage at first terminal 120 (Vin) is applied directly across inductor 173.

Now referring to timing diagram 1500, the second prefluxing state is shown at t5. The voltage at second junction 145 rapidly increases to the Vin voltage at first node 120 shown by trace 1525. Current in inductor 170 (trace 1530) increases rapidly, corresponding to the applied voltage and the characteristics of inductor 173. In some embodiment the rate of current increase can be substantially similar to the rate of current increase in the time between t2 and t3. The current in inductor 173 continues to increase until the switch state is changed, which in one embodiment may be controlled by a timer shown in step 1448. In some embodiments the timer in step 1448 may be a variable timer that can use a lookup table to adjust according to different load conditions and demands on switched regulation circuit 125. In further embodiments the timer in step 1448 may be variable and may be controlled by a feedback loop based on one or more characteristics of switched regulation circuit 125. In some embodiments the timer may be adjusted by the feedback loop to energize inductor 173 with an appropriate amount of current so that the inductor current resonates to zero just when capacitor 170 becomes fully discharged (discussed in the next step 1450). Other timer techniques as discussed herein may be used and are within the scope of this disclosure. In some embodiments the timer technique may be the same for multiple steps within the switching sequence.

In one embodiment a feedback loop may be used to monitor the current in inductor 173 and if the current is still positive when capacitor 170 becomes fully discharged, the timer may be reduced for the next charging cycle. Conversely, if the current in inductor 173 goes to zero before capacitor 170 becomes fully discharged, the timer may be increased for the next cycle. In further embodiments that employ a soft braking methodology, discussed in more detail below, the timer can be set to be at least as long as needed to preflux inductor 173 so the current never reaches zero before capacitor 170 is fully discharged and soft braking can be used to transition the remaining current in inductor 173. Other embodiments may use different techniques to control the timer and are within the scope of this disclosure.

Now referring to FIG. 14, step 1450, second and fourth solid-state switches M2, M4 remain on and first solid-state switch M1 is turned on while third solid-state switch M3 remains off. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 continues to increase and voltage at output node 176 (Vout) increases. This condition is illustrated in timing diagram 1500 in FIG. 15 at time t6.

Now simultaneously referring to FIGS. 2 and 15, at time t6 first solid-state switch 130 (i.e., trace 1505) turns off. The voltage at second junction 145 (i.e., trace 825) begins to decrease. As capacitor 170 resonates with inductor 173, it discharges (i.e., trace 1540) causing current to continue to increase in inductor 173 (i.e., trace 1530). This causes the voltage at Vout to increase. As the charge in capacitor 170 is reduced, current in inductor 173 may reverse and decreases (i.e., trace 1530). The controller then advances to steps 1455 and 1460 (see FIG. 14).

In step 1455, the current in inductor 173 is detected. In some embodiments the current may be detected as illustrated in FIG. 1 with comparator 190. In further embodiments, comparator 190 (see FIG. 1) may be used to monitor the current through fourth semiconductor switch 160 and indirectly through inductor 173, by detecting a voltage differential between ground 165 and second side 191 of capacitor 170. In other embodiments different methods may be used to detect current in inductor 173.

Referring now simultaneously to FIGS. 14 and 15, in step 1460, once the current in inductor 173 is approximately equal to zero, the controller proceeds back to step 1405, where third solid-state switch M3 is turned on and second solid-state switch M2 remains on while first solid-state switch M1 remains off and fourth solid-state switch M4 is turned off. Thus, M2 and M3 are on while M1 and M4 are off. In some embodiments, M4 may be turned on slightly before M3 is turned off. This configuration shorts capacitor 170, repeating the entire switching sequence 1400. As discussed above, since the current in inductor 173 and fourth solid-state switch M4 is at or near zero during the transition from step 1460 to 1405, zero current switching methods may be used to decrease switching losses, reduce input supply noise and improve efficiency, as discussed in more detail below.

In the particular switching sequence illustrated in FIG. 14, each solid-state switch may be configured to turn on and off only once during each repetitive switching cycle. Such a sequence may enable improved efficiency by reducing the number of switching transitions and minimizing switching efficiency losses. In other embodiments, different switching configurations and sequences may be used where one or more switches may be turned on and off more than once.

Figure 16:
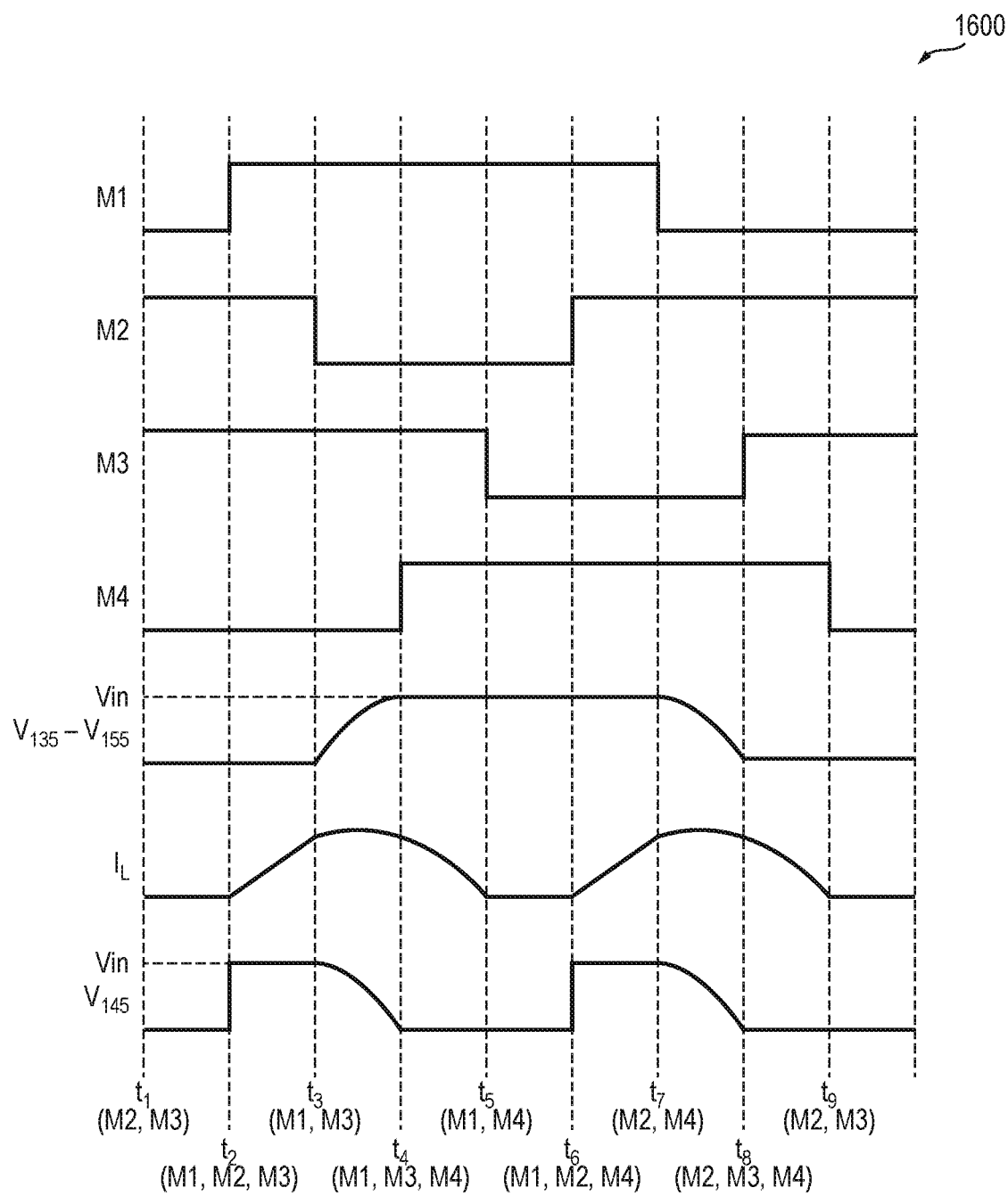
FIG. 16 is a timing diagram of voltages and currents within the switched regulation circuit of FIG. 2 according to the switching sequence in FIG. 14 including "soft braking"

Now referring to FIG. 16, timing diagram 1600 is illustrated which is a timing diagram for a similar switching sequence as sequence 1500 in FIG. 15, however timing diagram 1600 has two added "soft braking" steps. As discussed above, in some embodiments the timer steps (1418 and 1448 in FIG. 14) may be set to ensure that the prefluxing steps add sufficient energy to inductor 173 so the current never reaches zero before capacitor 170 is fully charged during the charging cycle (or fully discharged during the discharging cycle) and soft braking can be used to transition the remaining current in inductor 173. Soft braking may enable a higher current per phase and/or a smaller capacitor 170 per phase as compared to the methodologies discussed above.

In one embodiment a switching sequence where M1, M3 and M4 are on while M2 is off may be located after step 1430 in FIG. 14. In another embodiment a switching sequence where M2, M3 and M4 are on while M1 is off may be added after step 1460. The first soft braking sequence is labeled as t4 in FIG. 16 and the second soft braking switch sequence is labeled as t8. Other methodologies and switching sequences may be used and are within the scope of this disclosure.

Figure 17:
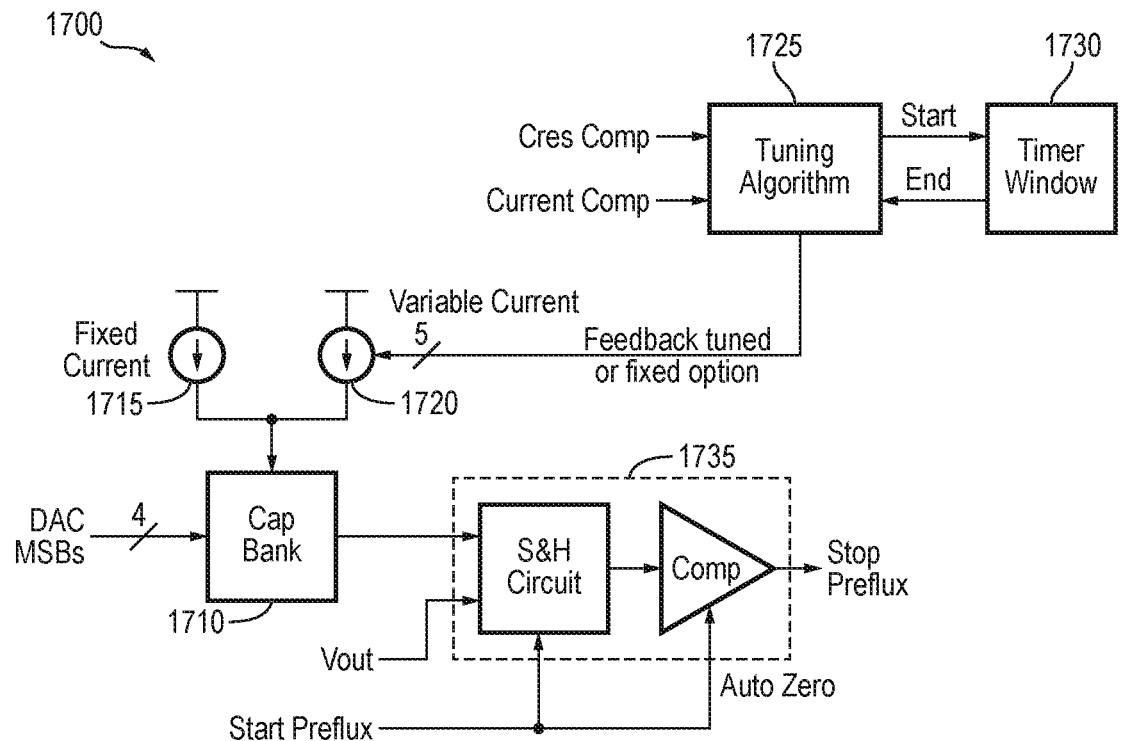
FIG. 17 is a method of controlling the preflux time with a variable timer.

Now referring to FIG. 17 one embodiment of a preflux timer method 1700 will be described. Preflux timer method 1700 is an example of a preflux timer that is proportional to one or more of the various characteristics of the regulator, however other preflux timers may also be proportional to one or more of the various characteristics of the regulator and may have different schematics and/or configurations which are within the scope of this disclosure.

In some embodiments the pre-flux timer may be a digitally programmed timer based on Vout/Vin (i.e., the duty factor) as described in more detail below. In further embodiments the accuracy of the timer may effect the efficiency of the circuit and thus it may be desirable to implement methods of increased accuracy.

In one embodiment preflux timer 1700 may use a switched capacitor bank 1710 that can be programmed to activate a specific number of capacitors using the most significant bits (MSB) of a digital to analog conversion (DAC) code that represents a target output voltage of the circuit. That is, the MSB's may represent and be used set the target output voltage for the circuit. For example, in one embodiment a higher target output voltage may correspond to a higher number of active capacitors in capacitor bank 1710 and a lower target output voltage may correspond to a lower number of active capacitors in the capacitor bank.

In some embodiments the active capacitors in capacitor bank 1710 may be charged using a fixed current source 1715 in combination with a variable current source 1720. Variable current source 1715 may be controlled by a variable feedback signal which is an output of a preflux tuning algorithm 1725. Tuning algorithm 1725 may be configured to adjust variable current source 1720 based on input from a Cres comparator and a current comparator, such as those discussed above. In one embodiment tuning algorithm 1725 may be configured to adjust the variable feedback signal to control the variable current source 1720 with a goal of the Cres comparator and the current comparator tripping at the same time. In further embodiments tuning algorithm 1720 may cause the inductor to be energized with an appropriate amount of current so current within the inductor resonates to zero at the same time as when the capacitor becomes fully charged. A timer window 1730 may be set at a value such that if the Cres comparator and the current comparator trip within the timer window time, that tuning algorithm 1725 makes no changes to variable current source 1720. However, if Cres comparator trips faster or slower than the current comparator by a time that is greater than timer window 1730, tuning algorithm 1725 adjusts feedback/variable current 1720 in a way to make Cres comparator closer in time to the current comparator. In some embodiments timer window 1730 may be fixed while in other embodiments it may be variable and may be programmable.

In one embodiment tuning algorithm 1725 may use the following steps, while other embodiments may use different steps:

Step 1: If current comparator trips first, increase the pre-flux time. Otherwise go to Step 2.

Step 2: Start 100 pS timer window after Cres comparator trips. Go to Step 3.

Step 3: If 100 pS timer window expires before the current comparator trips reduce the pre-flux time. If 100 pS timer window does not expire before the current comparator trips make no changes to the preflux time. Go to Step 1.

In some embodiments, capacitor bank 1710 may have a capacitor bank output voltage that feeds into a comparator 1735. In one embodiment comparator 1735 may include a sample and hold function as well as a comparator function and may have a set point that is adjusted with the variable feedback signal, as discussed above. Comparator 1735 may also use a output voltage of the circuit (Vout) as an input to compare with the capacitor bank output voltage. In one embodiment comparator 1735 may sample the output voltage of the circuit (Vout) when the preflux operation begins, then continuously sample the capacitor bank output voltage and compare it to the Vout. Once the capacitor bank output voltage ramps up and becomes equal to Vout, comparator 1735 may transmit a signal to stop the preflux operation.

In one embodiment the sample and hold function may have an auto zero comparator and may be employed to compare the ramping capacitor bank output voltage with the sampled value of Vout. In some embodiments Vout sampling may avoid any active/continuous (destabilizing) feedback from Vout on the timer calculation since in some embodiments the preflux Vout may ramp up very fast. The output of comparator 1735 may be used to send a signal to stop the inductor prefluxing operation.

Thus, in some embodiments preflux timer 1700 may have three variables to control the preflux time including, 1) the tuning algorithm 1725, 2) the DAC MSB setting (i.e. the target output voltage) and 3) the actual output voltage of the circuit (Vout). In further embodiments one or a combination of these variables may be used. For example in one embodiment only the DAC MSB setting may be used to adjust the target output voltage and the tuning algorithm may have a fixed current (as opposed to a variable current) and the Vout may use a fixed reference voltage (as opposed to the actual Vout voltage).

Figure 18:
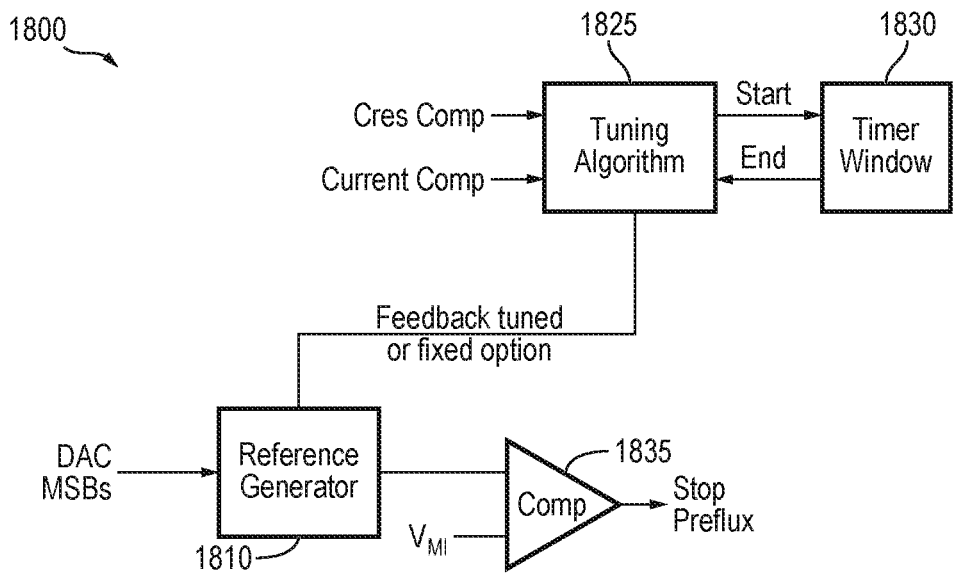
FIG. 18 is an alternative method of controlling the preflux time with a variable timer.

Now referring to FIG. 18 another embodiment of a preflux timer method 1800 will be described. Preflux timer method 1800 is similar to method 1700 however method 1800 is a simplified version removing the programmable capacitor bank and the sample and hold functions. Similar to preflux timer method 1700, preflux timer method 1800 is also proportional to one or more of the various characteristics of the regulator.

In one embodiment preflux timer 1800 may use a reference generator 1810 to generate a reference voltage from two inputs. The first input may be the DAC/MSBs described above that represents a target output voltage of the circuit. The second input may be a comparator set point that uses a variable input from a feedback loop controlled by the output of a preflux tuning algorithm 1825. Tuning algorithm 1825 may be configured to adjust the feedback based on input from a Cres comparator and a current comparator, such as those discussed above. In one embodiment tuning algorithm 1825 may be configured to adjust the feedback with a goal of the Cres comparator and the current comparator tripping at the same time. In further embodiments tuning algorithm 1820 may cause the inductor to be energized with an appropriate amount of current so current within the inductor resonates to zero at the same time as when the capacitor becomes fully charged. A timer window 1830 may be set at a value such that if the Cres comparator and the current comparator trip within the timer window time, that tuning algorithm 1825 makes no changes to the feedback. However, if Cres comparator trips faster or slower than the current comparator by a time that is greater than timer window 1830, tuning algorithm 1825 adjusts the feedback in a way to make Cres comparator closer in time to the current comparator. In some embodiments timer window 1830 may be fixed while in other embodiments it may be variable and may be programmable.

In some embodiments, reference voltage generator 1810 may have a reference voltage output that feeds into a comparator 1835. Comparator 1835 may also use a voltage across one of the solid-state switches described above in FIG. 1 such as M1, M2, M3 or M4. In one embodiment the voltage across M1 ($V_{M1}$) may be used as an input to comparator 1835 to compare with reference generator 1810 voltage. In some embodiments the first solid-state switch M1 may have a characteristic resistance so the input (e.g., $V_{M1}$) is proportional to the current in the inductor 173 (see FIG. 1) when M1 is in an on state allowing current to flow through the inductor. The output of comparator 1835 may be used to send a signal to stop the inductor prefluxing operation.

In further embodiments a comparator to monitor a voltage across a one of the solid-state switches described above in FIG. 1 such as M1, M2, M3 or M4 may be made using a ratiometric circuit. For example, in one embodiment a voltage across a relatively large M1 solid-state transistor may be monitored by fabricating a scaled down solid-state transistor M1x on the same die. In some embodiments, for example, M1x may be one one-thousandth the size of M1 and M1x may have the same gate voltage and source voltage as M1. The current of M1x may go to a current sink and a current comparator may be used to monitor the current through M1x as compared to a reference current. Since M1x is one one-thousandth the size of M1 the reference current may be set to one one-thousandth of the desired current in M1 so the comparator trips when the desired current in M1 is reached. In one embodiment second junction 145 (see FIG. 1) can be used as the reference input to the comparator. This may enable the copied current in M1x to match the current in M1. Note that in some embodiments the M1 solid-state switch may be in linear conduction (not saturation), therefore M1x may need the same gate drive voltage and same drain source voltage to copy the current accurately. In other embodiments a different ratio or other comparator methods may be used and are within the scope of this disclosure.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A power conversion circuit comprising:
a plurality of serially connected solid-state switches coupled between an input terminal and a ground and including an output terminal;
an inductor coupled between the output terminal and a load;
a capacitor coupled in parallel with two of the serially connected solid-state switches;
a controller configured to control the plurality of serially connected solid-state switches such that a voltage at the load is regulated by repetitively charging and discharging the capacitor,
wherein a current in the inductor increases during the charging of the capacitor, and wherein the controller is further configured to detect a voltage at the output terminal and compare the detected voltage at the output terminal to a first voltage, and to detect a voltage at the load and compare the detected voltage at the load to a second voltage; and
a preflux timer circuit that causes the controller to generate a first preflux condition in the inductor and subsequently charge the capacitor causing an increase in current flow in the inductor.

2. The power conversion circuit of claim 1 wherein the output terminal is positioned between the two serially connected solid-state switches that are coupled in parallel with the capacitor.

3. The power conversion circuit of claim 1 wherein current flowing in the inductor does not stop between charging and discharging the capacitor.

4. The power conversion circuit of claim 1 wherein current stops flowing in the inductor between charging and discharging the capacitor.

5. The power conversion circuit of claim 1 wherein the plurality of serially connected solid-state switches change state using zero voltage switching.

6. The power conversion circuit of claim 1 wherein the preflux timer circuit includes a switched capacitor bank.

7. A power conversion circuit comprising:
a plurality of solid-state switches;
an input terminal configured to supply power to one or more of the plurality of solid-state switches;
an output terminal configured to receive power from the input terminal, the power coupled to the output terminal via one or more of the plurality of solid-state switches;
an inductor coupled between the output terminal and a load;
a capacitor coupled in parallel with two serially connected solid-state switches of the plurality of solid-state switches;
a controller configured to control the plurality of solid-state switches such that a voltage at the load is regulated by repetitively charging and discharging the capacitor, wherein a current in the inductor increases during the charging of the capacitor, and wherein the controller is further configured to detect a voltage at the output terminal and compare the detected voltage at the output terminal to a first voltage, and to detect a voltage at the load and compare the detected voltage at the load to a second voltage; and
a preflux timer circuit that causes the controller to generate a first preflux condition in the inductor before charging the capacitor to cause an increase in current flow in the inductor.

8. The power conversion circuit of claim 7 wherein the output terminal is positioned between the two serially connected solid-state switches.

9. The power conversion circuit of claim 7 wherein a current flowing in the inductor does not stop between the charging and the discharging of the capacitor.

10. The power conversion circuit of claim 7 wherein current stops flowing in the inductor between the charging and the discharging of the capacitor.

11. The power conversion circuit of claim 7 wherein the plurality of solid-state switches change state using zero voltage switching.

12. The power conversion circuit of claim 7 wherein the preflux timer circuit includes a switched capacitor bank.

13. The power conversion circuit of claim 7 wherein the plurality of solid-state switches are disposed on a unitary semiconductor die that also contains the load.

* * * * *